US010498775B2

(12) United States Patent
Chiang et al.

(10) Patent No.: US 10,498,775 B2
(45) Date of Patent: Dec. 3, 2019

(54) EXCHANGING NON-TEXT CONTENT IN REAL TIME TEXT MESSAGES

(71) Applicant: T-Mobile USA, Inc., Bellevue, WA (US)

(72) Inventors: Hsin-Fu Henry Chiang, Bellevue, WA (US); Yasmin Karimli, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 280 days.

(21) Appl. No.: 15/693,279

(22) Filed: Aug. 31, 2017

(65) Prior Publication Data
US 2019/0068658 A1 Feb. 28, 2019

(51) Int. Cl.
H04L 29/06 (2006.01)

(52) U.S. Cl.
CPC ...... *H04L 65/1089* (2013.01); *H04L 65/1006* (2013.01); *H04L 65/1016* (2013.01); *H04L 65/1059* (2013.01); *H04L 65/1069* (2013.01); *H04L 65/80* (2013.01)

(58) Field of Classification Search
None
See application file for complete search history.

(56) References Cited

U.S. PATENT DOCUMENTS

| 7,953,608 B2 * | 5/2011 | McCallie, Jr. | G06Q 10/10 705/2 |
| 2006/0047840 A1 | 3/2006 | Postmus | |
| 2008/0280644 A1 * | 11/2008 | Hugot | H04L 63/0853 455/556.2 |
| 2012/0185604 A1 * | 7/2012 | Shatsky | H04L 65/1069 709/228 |
| 2012/0302201 A1 * | 11/2012 | Siomina | H04W 4/029 455/404.2 |
| 2014/0129676 A1 * | 5/2014 | Zeng | H04L 65/403 709/217 |
| 2015/0049867 A1 | 2/2015 | Jafry et al. | |
| 2015/0289118 A1 * | 10/2015 | Rose | H04W 4/14 455/466 |

(Continued)

OTHER PUBLICATIONS

PCT Search Report and Written Opinion dated Jan. 3, 2019 for PCT Application No. PCT/US2018/047741, 16 pages.

*Primary Examiner* — Phirin Sam
(74) *Attorney, Agent, or Firm* — Lee & Hayes, P.C.

(57) ABSTRACT

Non-text content may be exchanged in real time text (RTT) messages over a telecommunications network as part of an enhanced RTT (eRTT) service. A first UE can receive, from a second UE over a telecommunications network, capability information indicating whether the second UE is capable of exchanging text content and/or non-text content via RTT messages. Using this capability information, the first UE may determine whether to enable eRTT functionality on the first UE by determining whether to display a user interface element(s) in a selectable state on the display next to a RTT conversation window. The selectable user interface element(s), upon selection, allows a user of the first UE to create new non-text content, or select particular non-text content from available non-text content, for inclusion in a RTT message. The first UE may thereafter send non-text content in the RTT message to the second UE.

16 Claims, 10 Drawing Sheets

(56) References Cited

U.S. PATENT DOCUMENTS

| | | | |
|---|---|---|---|
| 2016/0227019 A1 | 8/2016 | Seol et al. | |
| 2017/0134315 A1 | 5/2017 | Cole et al. | |
| 2017/0164363 A1* | 6/2017 | Zhang | H04L 1/00 |
| 2017/0220212 A1 | 8/2017 | Yang et al. | |
| 2017/0359286 A1* | 12/2017 | Ghannam | H04L 51/10 |
| 2018/0158225 A1* | 6/2018 | Yang | H04N 1/00159 |
| 2019/0037172 A1* | 1/2019 | Choi | H04L 65/1083 |

* cited by examiner

(12) United States Patent — US 10,498,775 B2

EXCHANGING NON-TEXT CONTENT IN REAL TIME TEXT MESSAGES

BACKGROUND

Communication devices have traditionally been used to facilitate oral communication (e.g., talking) over a telecommunications network. However, non-oral communication remains important in today's society. For example, some people simply prefer texting over talking, while others, such as the hearing and speech impaired, may be physically unable to communicate orally.

Teletypewriter (TTY) technology was developed in the 1960's to allow the hearing and speech impaired to communicate using text over standard telephone lines. TTY was later implemented in wireless networks for use with mobile handsets, but as wireless networks evolved from a circuit-switched (CS) architecture to a packet-switched (PS) architecture, TTY technology became unsuitable for use in wireless networks, which are primarily based on Internet Protocol (IP) communications. This led to a decision by the Federal Communications Commission (FCC) to mandate that carriers replace legacy TTY technology with real time text (RTT) technology.

RTT allows for a near instantaneous transmission of text content between IP-based terminals. As a user of a source device types a RTT message, the text content of the RTT message is displayed on a destination device in real-time, without requiring the user of the source device to select a "send" button. This near instantaneous transmission of text content resembles a more natural conversation that is preferred by the hearing and speech impaired over traditional text messaging (e.g., Short Message Service (SMS) text). RTT also allows both parties of a communication session to type concurrently (e.g., allowing one user to interrupt the other user), and RTT can be implemented as an add-on to voice, which enables simultaneous voice and RTT media streams. However, technical limitations of RTT technology only allow text content (e.g., typographical characters) to be transmitted in RTT messages. Thus, if a sending user wants to send a digital photograph to another user, for example, the sending user is required to invoke a standard messaging application to send the digital photograph over the telecommunications network. This type of transmission can experience discernable latency due to the "store and forward" transmission technique of standard messaging services, and the relatively low Quality of Service (QoS) assigned thereto. Furthermore, because of RTT's newness, the networking implementations of RTT technology are rather limited today.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
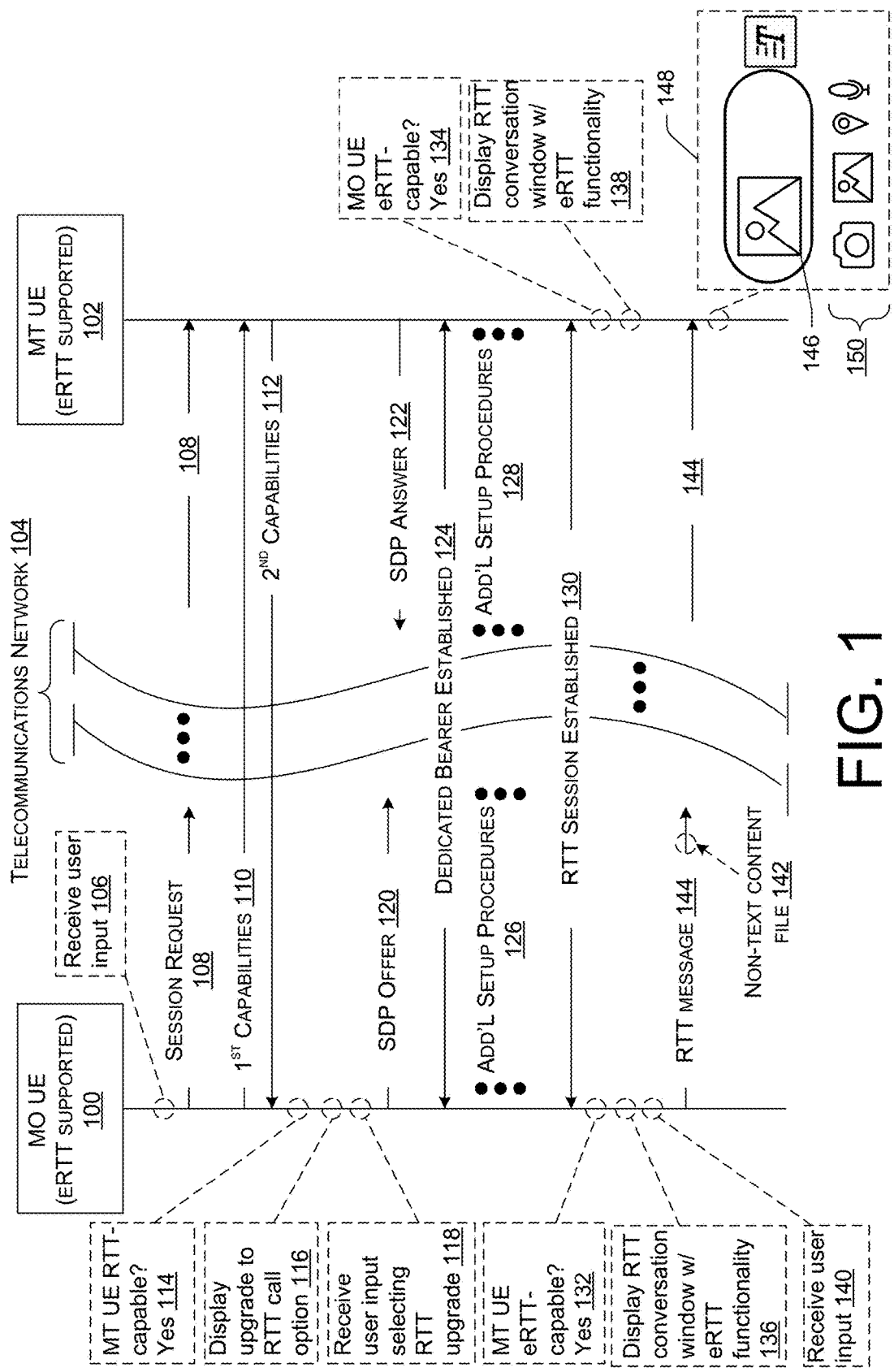
FIG. 1 is a diagram illustrating an originating user equipment (UE) configured to enable enhanced RTT (eRTT) functionality based on capability information received from a terminating UE, and vice versa, the eRTT functionality, when enabled, allowing a user to send non-text content in a RTT message, over a telecommunications network.

Described herein are, among other things, techniques and systems for exchanging non-text content in real time text (RTT) messages over a telecommunications network. The ability to exchange non-text content in RTT messages is sometimes referred to herein as "Enhanced Real Time Text" (eRTT), which can be provided as a separate IP Multimedia Subsystem (IMS)-based service along with other IMS-based services that a carrier might offer to its subscriber base. As used herein, "non-text content" refers to digital content that does not exclusively include text content (i.e., typographical characters, such as letters, numbers, words, phrases, symbols, etc.) and that also does not exclusively include real time voice content (i.e., voice data that is transmitted in real time as part of a voice-based communication session). Thus, "non-text content," as used herein, may include, without limitation, image content (e.g., digital pictures, photos, etc.), video content, multimedia content, graphical content, geolocation content (e.g., a digital map indicating a geographic location of a user equipment (UE)), contacts/address book content, calendar content, recorded audio content (e.g., audio clips), and/or other types of digital files of non-text content.

Two or more UEs may be configured to perform capability discover by exchanging capability information that indicates whether the individual UEs are capable of exchanging text content and/or non-text content via RTT messages. An "eRTT-capable" UE, as used herein, means a UE that is capable of exchanging text content and non-text content via RTT messages. Accordingly, an eRTT-capable UE may, after receiving capability information associated with another UE, enable or disable eRTT functionality based at least in part on the capability information of the other UE. When eRTT functionality is enabled, the eRTT-capable UE may display one or more user interface elements in a selectable state next to a RTT conversation window. Upon selecting the user interface element(s), a user may include non-text content in a RTT message. Thus, when a pair of UEs support the exchange of non-text content in RTT messages, the users associated with the UEs can exchange non-text content (e.g., digital pictures, video clips, etc.) via RTT messages.

A process to be implemented by a first UE can include receiving, from a second UE over a telecommunications network, capability information indicating whether the second UE is capable of exchanging text content and/or non-text content via RTT messages. Based at least in part on the capability information, if it is determined that the second UE is capable of exchanging at least text content via RTT messages, the first UE may display a RTT conversation window on a display of the first UE for exchanging the text content via RTT messages. If it is determined, from the capability information, that the second UE is also capable of exchanging the non-text content via the RTT messages, the first UE may further enable eRTT functionality by displaying a user interface element(s) in a selectable state on the display next to the RTT conversation window. The selectable user interface element(s), upon selection, allows a user of the first UE to create new non-text content, or select particular non-text content from available non-text content, for inclusion in a RTT message. The first UE may thereafter send non-text content in the RTT message to the second UE. It is to be appreciated that the first UE in this example process can represent either an originating UE or a terminating UE in the context of a communication session with the second UE.

If, on the other hand, the received capability information indicates that the second UE is incapable of exchanging the non-text content via RTT messages, the first UE may be configured to disable eRTT functionality, according to some embodiments. Disabling the eRTT functionality may include refraining from displaying the user interface element(s) for adding non-text content to RTT messages altogether, or displaying the user interface element(s) in an unselectable state on the display next to the RTT conversation window.

In some embodiments, the first UE may be configured to enable eRTT functionality despite the received capability information indicating that the second UE is incapable of exchanging the non-text content via RTT messages. In this scenario, the UEs can exchange non-text content. To do so, the first UE sends/receives non-text content in RTT messages, and the second UE sends/receives non-text content using a standard messaging application (e.g., Multimedia Messaging Service (MMS)).

By enabling the exchange of non-text content in RTT messages based on capability information of another UE, the functionality of one or more devices can be improved and/or optimized. For instance, because RTT messaging may be assigned a higher QoS than a QoS assigned to traditional IMS-based messaging services (e.g., SMS text), the resulting communication of non-text content via RTT messages may be perceived by the users of the conversation as being a real-time content exchange (i.e., non-text content can be sent/received with very little latency), as compared to latency that may be experienced in traditional IMS-based messaging services. In other words, non-text content is treated with a sense of urgency by enabling its transmission via RTT messages, similar to the level of treatment that voice data is given during a voice call, which allows for a low latency, real time, transmission of non-text content between participating UEs.

User experience may also be enhanced with eRTT-capable UEs because the users no longer need to "flip" back and forth between a messaging application and a communication session application (e.g., a RTT calling application) in order to send or receive non-text content to or from the other party during the communication session. That is, the display functionality of the UE may be improved because the non-text content can be displayed on the same screen that displays the text content of a RTT conversation during an active communication session.

Furthermore, privacy of the user's content may be better preserved, as compared to sending sensitive non-text content via standard IMS-based messaging services. For instance, non-text content that is sent via RTT messages during an active, RTT-based communication session, as described herein, can be logged as part of the communication session, rather than being stored by a remote server and subsequently forwarded to the other UE, as is the practice in standard IMS-based messaging services, such as SMS text. That is, user privacy may be better protected because the transmission of non-text content may exclusively occur during the active communication session. The techniques and systems described herein may further allow one or more devices to conserve resources with respect to communications bandwidth resources, processing resources, memory resources, power resources, and/or other resources. Additional technical effects can also be realized from an implementation of the technologies disclosed herein.

Also described herein are systems and devices comprising one or more processors and one or more memories, as well as non-transitory computer-readable media storing computer-executable instructions that, when executed, by one or more processors perform various acts and/or processes disclosed herein.

FIG. 1 is a diagram illustrating an originating UE 100 (designated as "MO UE" 100 in FIG. 1, "MO" meaning "mobile originated" or "mobile originating") configured to enable enhanced RTT (eRTT) functionality based on capability information received from a terminating UE 102 (designated as "MT UE" 102 in FIG. 1, "MT" meaning "mobile terminated" or "mobile terminating"). The terminating UE 102 shown in FIG. 1 is also eRTT-capable, and, thus, the terminating UE 102 is also configured to enable eRTT functionality based on capability information received from an originating UE 100. When eRTT functionality is enabled, as shown in FIG. 1, a user is allowed to send non-text content in a RTT message over a telecommunications network 104.

In accordance with various embodiments described herein, the terms "user equipment (UE)," "communication device," "device," "wireless communication device," "wireless device," "mobile device," "terminal," "wireless terminal," "mobile terminal," and "client device," be used interchangeably herein to describe any UE (e.g., the originating UE 100, the terminating UE 102, etc) that capable of transmitting/receiving data, wirelessly and/or over wired networks, using any suitable communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), IEEE 802.1x protocols, WiMAX, Wi-Fi, Data Over Cable Service Interface Specification (DOCSIS), digital subscriber line (DSL), and/or any future IP-based network technology or evolution of an existing IP-based network technology.

Furthermore, the originating UE 100 and the terminating UE 102 may individually be implemented as any suitable type of communication device configured to communicate over a telecommunications network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), an in-vehicle (e.g., in-car) computer, and/or any similar communication device. In addition, the originating UE 100 and the terminating UE 102 may be mobile devices, or they may be non-mobile (or situated) communication devices including, without limitation, a television (smart television), a set-top-box (STB), a game console, a desktop computer, and the like.

In general, a user can utilize a UE 100/102 to communicate with other users and associated terminals via the telecommunications network 104. A user of the originating UE 100 is often referred to herein as the "calling party," while a user of the terminating UE 102 is often referred to herein as the "called party." The telecommunications network 104 may represent a network comprising a plurality of network nodes disposed between the originating UE 100 and the terminating UE 102. It is to be appreciated that the telecommunications network 104 can include any suitable types, and number, of network nodes to enable the transmission of IP multimedia over the telecommunications network 104. For example, the telecommunications network 104 may include, without limitation, various radio access networks (RANs) (e.g., eNodeB, cell towers, wireless access points, etc.), an evolved packet core (EPC), as well as a multimedia telephony (MMTel) and IMS architecture (sometimes referred to as the "IMS core network," the "IMS network," the "Core Network (CN)," or the "IM CN Subsystem"). The IMS is an architectural framework defined by the $3^{rd}$ Generation Partnership Project (3GPP) for delivering IP multimedia to UEs, such as the originating UE 100 and the terminating UE 102.

Various portions of the telecommunications network 104 can be maintained and/or operated by one or more service providers, such as one or more wireless carriers (sometimes referred to as "operators"), that provide IMS-based services to users (sometimes called "subscribers") who are associated with UEs for accessing the IMS-based services to which they have subscribed. For example, a service provider may offer multimedia telephony services that allow a subscribed user to call or message other users via the telecommunications network 104 using his/her UE 100/102. A user can also utilize an associated UE 100/102 to receive, provide, or otherwise interact with various different IMS-based services by accessing the IMS core of the telecommunications network 104. In this manner, a carrier may offer any type of IMS-based service, such as, telephony services, emergency services (e.g., E911), gaming services, instant messaging services, presence services, video conferencing services, social networking and sharing services, location-based services, push-to-talk services, WiFi calling services, RTT calling services, RTT video calling services, and so on.

In addition, a new type of IMS-based service is defined and described herein. This new type of IMS-based service can be referred to, by way of example and not limitation, as an "Enhanced RTT" (eRTT) service. This eRTT service may be a standalone service, or it may be provided as an augmentation to other RTT-based services, such as an augmentation to RTT calling. In any case, eRTT allows for the exchange of non-text content via RTT messages over the telecommunications network 104, as described herein.

In order to access one or more of the IMS-based services described herein and/or known to a person having ordinary skill in the art, an originating UE 100 is configured to request establishment of a communication session. Although many of the examples described herein relate to the originating UE 100 accessing RTT calling services with eRTT functionality enabled, whereby a communication session is established with a voice media stream and a RTT media stream that can carry both text and non-text content, it is to be appreciated that the originating UE 100 may request establishment of any type of communication session. In addition, the described eRTT service can be used as an add-on service for any suitable type of communication session, such as RTT video calling.

Before requesting establishment of a communication session, both the originating UE 100 and the terminating UE 102 can request registration for one or more IMS-based services while the UE's 100/102 are in idle mode. Registration can involve identifying a proxy call session control function (P-CSCF) node of the telecommunications network 104, sending a registration request via a RAN (e.g., an LTE RAN) to the identified P-CSCF node, and receiving a response indicating a result of the registration request. In instances where a legacy network (e.g., a CS network) is available to the UE 100/102, the registration procedure may be in the form of a "combined attach" procedure where the UE 100/102 performs registration for both a legacy (e.g., CS (non-LTE) network) and PS e.g., (LTE) network. By being "combined attached," the UE 100/102 can implement fallback procedures to reattempt establishment of a communication session via a legacy network in the event that an LTE-based communication session (e.g., a VoLTE-based RTT call) fails on the LTE network.

Session Initiation Protocol (SIP) may be used for transmitting SIP messages in the signaling portion of the communication session, as opposed to the data or media stream portion of the communication session. Such SIP messages may include, without limitation, registration messages, communication session messages, and the like, which are sent to the IMS core of the telecommunications network 104, and received therefrom. SIP is a signaling protocol that can be used to establish, modify, and terminate communication sessions over packet networks, and to authenticate access to IMS-based services. As used herein, a "SIP request" is a message that is sent from a UE 100/102 to the IMS core of the telecommunications network 104 using SIP protocol, and a "SIP response" is a message that is sent from the IMS core of the telecommunications network 104 to a UE 100/102 using SIP protocol.

When a user of the originating UE 100 wants to establish a communication session (e.g., a VoLTE call), the user may provide user input to the originating UE 100. Thus, FIG. 1 shows that the originating UE 100 receives user input at 106. The user input received at 106 can be provided in any suitable form known to a person having ordinary skill in the art, such as user input in the form of a voice command that is captured by a microphone of the originating UE 100 (e.g., "call Yasmin's cell"), user input in the form of touch input that is received via a touch screen of the originating UE 100, or that is received via physical keys or a keypad of the originating UE 100, user input in the form of a gesture that is captured by a camera of the originating UE 100, and so on. In an example, the user may initiate establishment of a communication session by providing touch-based user input to a touch screen of the originating UE 100, such as by dialing a phone number or by selecting a contact from a list of contacts presented on the display of the originating UE 100. It is to be appreciated that the originating UE 100 may be configured to present various options to the user for initiating any type of communication session supported by the originating UE 100, such as a normal voice call (e.g., a VoLTE call), an RTT call, a video call, and so on. If the user invokes normal calling function (e.g., by selecting a "call" soft button presented on the touch screen of the originating UE 100), the to-be-established communication session may be a VoLTE call that includes a voice stream for voice data.

In response to receiving the user input at 106, the originating UE 100 may attempt to establish a communication session. To establish the requested communication session, the originating UE 100 can send a session request 108 over the telecommunications network 104 (e.g., to the IMS core). The session request 108 can comprise a SIP message using the SIP INVITE method to request that a communication session be established with a terminating UE 102. Ultimately, the session request 108 can be forwarded to the terminating UE 102, as shown in FIG. 1. Accordingly, the terminating UE 102 receives the session request 108 (e.g., in the form of a SIP INVITE) requesting to establish a communication session.

Device capabilities may be exchanged between the originating UE 100 and the terminating UE 102 as part of a capability discovery procedure, which may occur at any suitable time relative to the establishment of the communication session. FIG. 1 shows an example where the capability discovery procedure occurs during setup of the communication session.

The originating UE 100 may send, and the terminating UE 102 may receive, first capabilities 110 (or first capability information 110) indicating whether the originating UE 100 is capable of exchanging text content and/or non-text content via RTT messages. FIG. 1 shows that the originating UE 100 supports eRTT, and, hence, the first capability information 110, in the example of FIG. 1, indicates that the originating UE 100 is capable of exchanging both text content and non-text content via RTT messages. Likewise, the terminating UE 102 may send, and the originating UE 100 may receive, second capabilities 112 (or second capability information 112) indicating whether the terminating UE 102 is capable of exchanging text content and/or non-text content via RTT messages. Again, the example of FIG. 1 shows that the terminating UE 102 also supports eRTT, and, hence, the second capability information 112, in the example of FIG. 1, indicates that the terminating UE 102 is capable of exchanging both text content and non-text content via RTT messages.

Although shown as separate signals/messages, the first capability information 110 can be included in the session request 108 itself, such as in a header of the session request 108 (e.g., a SIP INVITE header). Alternatively, separate messages (e.g., SIP messages) can be used to carry the session request 108 and the first capability information 110 of the originating UE 100. In an example, the first capability information 110 may be provided in a header of a SIP message using the SIP OPTIONS method. The terminating UE 102 may send its own second capability information 112 in a header of a SIP message, such as a SIP message using the SIP OPTIONS method.

The capability information 110 and 112 can be used by particular nodes of the telecommunications network 104 and/or by the UE's 100 and 102 to determine whether the UE's 100 and 102 individually support the exchange of text content and/or non-text content in RTT messages. The capability information 110 and 112 may include one or more feature tags. If the UE 100/102 supports eRTT functionality, the capability information 100/112 may include at least one feature tag indicating that the UE 100/102 is capable of exchanging non-text content via RTT messages. For example, the capability information 110/112 may include a feature tag with a Feature tag value='sip.eRTT' to indicate that the originating UE 100/102 supports eRTT functionality (i.e., exchanging non-text content via RTT messages). When such a feature tag is included in the capability information 100/112, this may indicate that the UE 100/102 supports the exchange of a variety of types of non-text content that are inclusive in an eRTT service. For example, a feature tag with a Feature tag value='sip.eRTT' may indicate that a particular UE 100/102 supports the exchange of image content (e.g., pictures, photos, etc.), video content, multimedia content, graphical content, geolocation content, contacts/address book content, calendar content, recorded audio content, and/or other types of digital files of non-text content. Conversely, if the capability information 100/112 were to omit such a feature tag, this can be interpreted by a receiving UE 100 as an indication that the other UE 102 is incapable of exchanging non-text content, including the various types of non-text content described herein.

Additionally, or alternatively, individual feature tags can be associated with, and correspond to, individual types of non-text content. In this scenario, eRTT may support a plurality of different types of non-text content for transmission via RTT messages, and possibly at different hierarchical levels of a non-text content taxonomy such that particular types of content can be categorized into different categories of non-text content. As an illustrative example, a first feature tag may correspond to a first type of non-text content (e.g., image content), while a second feature tag may correspond to a second type of non-text content (e.g., geolocation content), and so on, whereby multiple different feature tags can be defined for various different types of non-text content, and possibly various different categories of non-text content that include multiple different types of non-text content, as defined by an eRTT service. Accordingly, the capability information 110/112 may include multiple feature tags, which may allow the UE 100/102 to support a subset of the available types of non-text content, but perhaps not all of the available types of non-text content available for eRTT. For instance, the capability information 110 may indicate that the originating UE 100 is capable of exchanging image content, video content, and recorded audio content by virtue of including feature tags in a SIP message header that correspond to those types of non-text content. Furthermore, by the omission of other possible feature tags in the SIP message header that correspond to other available types of non-text content included in an eRTT service, the capability information 110 may thereby indicate that the originating UE 100 is incapable of exchanging those other available types of non-text content.

As mentioned, capability discovery (i.e., the exchange of the capability information 110 and 112) can occur at any suitable time relative to the establishment of a communication session without departing from the basic characteristics of the techniques and systems described herein. For instance, capability discovery can occur prior to the initiation of the setup of the communication session (i.e., before receiving the user input at 106, which triggers the session request 108). An example of exchanging capability information 110/112 prior to the initiation of the setup of the communication session includes exchanging capability information 110/112 during a registration procedure performed by the UE 100/102. For example, the originating UE 100 may include the aforementioned feature tag(s) in a SIP REGISTER message (e.g., in a header of the SIP REGISTER message), prior to the originating UE 100 receiving the user input at 106.

Another example of exchanging capability information 110/112 prior to the initiation of the setup of the communication session includes exchanging capability information 110/112 with the use of a publish/subscribe model prior to initiating the setup of a communication session (e.g., before the originating UE 100 receives the user input at 106). For example, one or both of the UE's 100 and/or 102 may publish capabilities (e.g., the capability information 110/112), such as whether they individually support eRTT functionality, to a presence server. The other or both of the UE's 100 and/or 102 may also subscribe to the capability info that is published by the other UE. Once a UE, such as the terminating UE 102, subscribes to the published information of the other UE, such as the originating UE 100, the capabilities (e.g., RTT supported, eRTT supported, etc.) published by the other UE are known to the subscribing UE. In this example, or any of the previous examples for that matter, the capability information 110/112 may include an Extensible Markup Language (XML) tag that indicates whether the UE 100/102 is capable of exchanging text content and/or non-text content via RTT messages.

Furthermore, capability discovery can occur after the communication session is established, such as during an ongoing, active VoLTE call, RTT call, or the like. Thus, it is to be appreciated that capability discovery can occur before, during, or after setup of a communication session. Here, "before setup" means before initiating the setup of the communication session (e.g., before receiving the user input at 106, which triggers the session request 108), and "after setup" means after establishing the communication session (e.g., after receiving a final 2xx response to establish a communication session).

As shown in FIG. 1, the originating UE 100 may, at 114, determine, from the second capability information 112, that the terminating UE 102 is capable of exchanging at least text content via RTT messages. In response to this determination at 114, the originating UE 100 may, at 116, display a selectable option to upgrade the communication session to a RTT call that supports the exchange of the RTT messages (i.e., a combination of voice and RTT media streams) during the communication session.

The display of the selectable upgrade option at 116 may be further based on the ability to upgrade in the first place (i.e., the upgrade option is displayed at 116 if the user input received at 106 corresponds to a request to establish the communication session as a normal voice call (e.g., a VoLTE call), which does not support an exchange of the RTT messages during the communication session. In the case where capability discover occurs before setup of the communication session, it is to be appreciated that the user input received at 106 may correspond to a request to establish a RTT call from the outset. In this scenario, the selectable upgrade option may not be displayed at 116, seeing as how there is no need to upgrade to an RTT call.

At 118, the originating UE 100 may receive user input indicating that the selectable upgrade option is selected, which causes the originating UE 100 to perform setup procedures in an effort to setup and establish the communication session as a RTT call. It is to be appreciated that, in the example of FIG. 1, where the terminating UE 102 also supports basic RTT functionality, a similar option to upgrade to a RTT call may be displayed on the display of the terminating UE 102. In some cases, however, this upgrade option may be presented exclusively to the calling party, and not presented to the calling party, giving the calling party more control to dictate the type of communication session that is established.

FIG. 1 further shows that the originating UE 100 can send a Session Description Protocol (SDP) offer 120 in order to negotiate initialization parameters for content (text content and/or non-text content) that is to be transmitted during the communication session. SDP is a format for describing streaming media initialization parameters. SDP does not deliver media itself, but is used between end points for negotiation of media type, format, and associated properties thereof. The terminating UE 102 may send a SDP answer 122 in order to negotiate the initialization parameters for content that is to be transmitted during the communication session. The SDP answer 122 may be sent in response to the SDP offer 120.

A dedicated bearer (e.g., a dedicated evolved packet system (EPS) bearer) may be established at 124 for the communication session. The originating UE 100 may perform additional setup procedures 126, and the terminating UE 102 may perform its own additional setup procedures 128 in an effort to establish the communication session. The additional setup procedures 126 and 128 can comprise various actions and message transmissions by and between the UEs 100 and 102, and by and between each UE 100/102 and various network nodes of the telecommunications network 104 (e.g., IMS nodes). Furthermore, it is to be appreciated that the arrangement of the signaling in FIG. 1 is not necessarily meant to depict a particular order of the signaling that is to take place during the setup of a communication session. With this in mind, some or all of the additional setup procedures 126/128 may occur before, during, or after any of the other specific signaling that is shown in FIG. 1. That said, the additional setup procedures 126/128 are to represent setup procedures that occur after the session request 108 (e.g., a SIP INVITE) and before a final response, such as a final 2xx response to indicate a successful establishment of the communication session.

To this end, the additional setup procedures 126/128 may represent any type of setup procedures, in any suitable number, that may be performed to setup and establish the communication session. Some examples of the additional setup procedures 126/128 include, without limitation, sending/receiving a session progress message (sometimes called a "183 response"), establishing a radio resource control (RRC) connection with a preferred RAT (e.g., an LTE RAT), sending/receiving a 100 Trying message (indicating the session request 108 has been received at the terminating UE 102), sending/receiving a 180 Ringing message (indicating that a terminating party of the terminating UE 102 is being alerted), sending/receiving an UPDATE message, sending/receiving various "ACK" message (e.g., a PRACK message), and so on. Thus, the additional setup procedures 126/128 may represent various setup procedures that occur during particular setup phases for a communication session, such as a pre-alerting phase, an alerting phase, and so on. A person having ordinary skill in the art will readily recognize that additional setup procedures 126/128 are not limited to the examples described herein, and that other (e.g., different and/or additional) setup procedures may be performed in order to setup the communication session over a telecommunication network 104. Furthermore, some of the example setup procedures described herein may be omitted or unnecessary for setting up a communication session.

Upon the terminating UE 102 sending a final 2xx response (e.g., 200 (OK)), the communication session may be established at 130. It is to be appreciated that, in the event that there is an issue with setting up the communication session, other types of final responses may be transmitted to resolve the session setup, such as a 4xx—client failure, a 5xx—server failure, or a 6xx—global failure. The communication session setup is not complete unless and until the terminating UE 102 transmits a final response (e.g., a 2xx response 130, a 4xx response, a 5xx response, a 6xx response, etc.). Furthermore, the communication session is not established at 130 unless and until the terminating UE 102 transmits a final response in the form of a 2xx response (e.g., 200 (OK)).

The communication session that is established at 130 is shown as a RTT-based communication session. In this example, the user may have either explicitly requested an RTT-based session by virtue of selecting an appropriate soft button (e.g., a "RTT call" soft button) at 106, or the initially requested a non-RTT-based session (e.g., a VoLTE call) at 106, and subsequently upgraded to an RTT-based session at 118.

At 132, the originating UE 100 may determine, from the second capability information 112, that the terminating UE 102 is also capable of exchanging non-text content via RTT messages (i.e., that the terminating UE 102 is eRTT-capable). Similarly, at 134, the terminating UE 102 may determine, from the first capability information 110, that the originating UE 100 is capable of exchanging non-text content via RTT messages (i.e., that the originating UE 100 is eRTT-capable).

Figure 5:
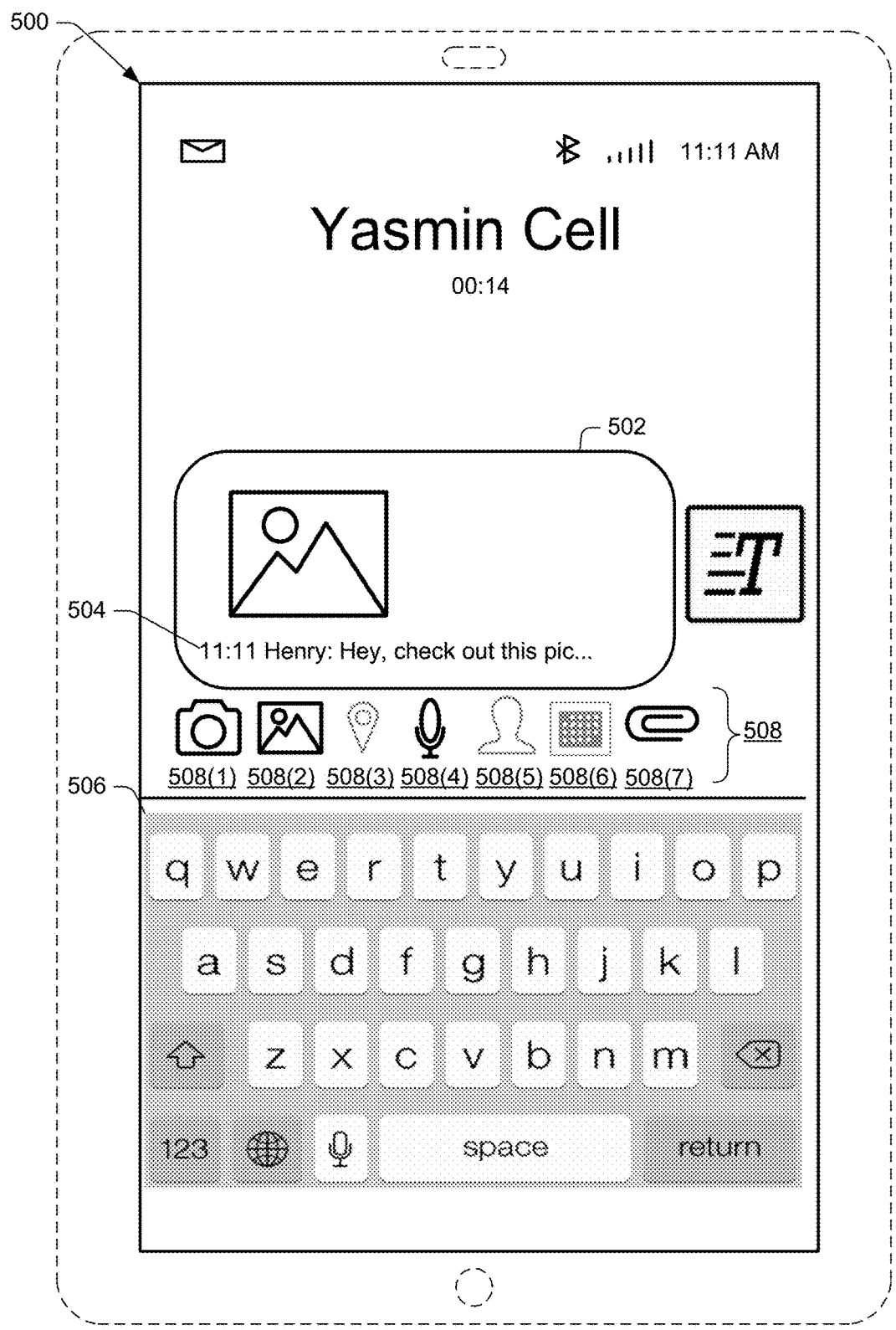
FIG. 5 illustrates an example user interface of an originating UE that is displayed during an established communication session, the user interface presenting one or more user interface elements next to a RTT conversation window, the one or more user interface elements being enabled or disabled based on capability information received from a terminating UE.

At 136, the originating UE 100 may display a RTT conversation window on a display of the originating UE 100. The display of the RTT conversation window may be based on the terminating UE 102 being RTT-capable (i.e., capable of exchanging text content via RTT messages), regardless of whether or not the terminating UE 102 is eRTT capable or not. An example of a RTT conversation window that may be displayed at 136 is shown in FIG. 5, and will be discussed in more detail below with respect to FIG. 5. In general, the RTT conversation window includes a user interface mechanism (e.g., a content entry field) to receive and display content (text and/or non-text content) that is exchanged during a RTT-based session.

Furthermore, at 136, the originating UE 100 may enable eRTT functionality along with the display of the RTT conversation window, meaning that one or more user interface elements may be displayed next to the RTT conversation window in a selectable state. The enabling of the eRTT functionality at 136 may be based on the terminating UE 102 being eRTT-capable (i.e., capable of exchanging non-text content via RTT messages), as determined from the second capability information 112. Again, FIG. 5 provides an example of this eRTT functionality enablement, and will be discussed in more detail below with respect to FIG. 5. In general, upon selection of the enabled user interface element(s), a user of the originating UE 100 is able to create new non-text content, and/or select particular non-text content from available non-text content, for inclusion in a RTT message. Because FIG. 1 is an example where the terminating UE 102 is also eRTT-capable, the terminating UE 102 may, at 138, similarly display an RTT conversation window with eRTT functionality enabled. FIG. 1 illustrates an example where an RTT conversation window is displayed on the terminating UE 102 at 148 along with user interface elements 150, which are displayed next to the RTT conversation window of the terminating UE 102 and are selectable by a user of the terminating UE 102 for including non-text content in RTT messages.

FIG. 1 shows an example, where the originating UE 100 receives user input at 140, the user input indicating that the user selects one of the displayed user interface elements (similar to the user interface elements 150) in order to include non-text content (e.g., a non-text content file 142) in a RTT message 144. In the example of FIG. 1, the non-text content file 142 corresponds, by way of example and not limitation, to a digital photograph (photo) 146, which may be displayed in the RTT conversation window of the terminating UE 102 at 148, in real time.

The RTT message 144 may be sent using Real-time Transport Protocol (RTP) and user datagram protocol (UDP) to carry content (e.g., text content and/or non-text content 142) of the RTT media stream in packets that can be transmitted at a desired frequency (e time sampled) to resemble real-time transmission. For example, the originating UE 100 may send RTT packets at a particular frequency (e.g., every second) in order to resemble a real-tune conversation and near instantaneous display of the text content on the terminating UE 102, as the calling party enters content into the RTT conversation window on the originating UE 100. In some embodiments, the RTT media stream is assigned a QoS Class Identifier (QCI) value that is suitable for real time transmission, such as a QCI value of 1, as defined in LTE. This QCI value may correspond to the QoS that is the same QoS given to voice data during a communication session. QCI is a scalar denoting a set of transport characteristics (e.g., bearer with/without guaranteed bit rate (GBR), priority, packet delay budget, packet error loss rate, etc.) and is used to infer specific parameters related to packet forwarding (e.g., scheduling weights, admission thresholds, queue management thresholds, link-layer protocol configuration, etc.).

The Internet Engineering Task Force (IETF) Request for Comments (RFC) 4103 sets forth a technical specification for carrying text content of an RTT message in RTP packets. The Alliance for Telecommunication Industry Solutions (ATIS) 0700029 sets forth an additional technical specification for certain aspects of the mobile device behavior for handling RTT to facilitate communication between mobile devices (including emergency services) across multiple Commercial Mobile Service Providers (CMSPs). Unless otherwise specified, non-text content of an RTT message, such as the non-text content file 142 of the RTT message 144, can be transmitted as part of a MT media stream using the same or similar details (e.g., techniques, parameters, etc.) specified for text content according to the IE If RFC 4103 and/or ATIS 0700029 specifications.

As shown in FIG. 1, the terminating UE 102 may receive the RTT message 144 in real time, as the calling party inserts the non-text content file 142 into the RTT message 144. As used herein, "real-time" or "substantially real-time" means that a time period measured from the moment content (e.g., non-text content) is input on a source device to a moment the same content is displayed on a target/receiving device is sufficiently short to experience, at the target/receiving device a display of content as the calling party is entering the content at the source device. This period of time may be on the order of a few seconds, and it is recognized that there will be some amount of time delay between inputting content on the source device and displaying the content on the target/receiving device. Accordingly, the terminating UE 102 may display the digital photo 146 of the RTT message 144 at 148, in real-time.

Thus, FIG. 1 illustrates a signaling flow to enable the exchange of non-text content between eRTT-capable UEs 100/102 in a RTT message 144, as well as the capability discovery procedure for doing so. In an example use case, Henry (associated with the originating UE 100) would like to share non-text content with Yasmin (associated with the terminating UE 102). The non-text content that Henry would like to share may be sensitive content (e.g., proprietary to a business venture, etc.). Henry's device 100 (an eRTT-capable device) discovers that Yasmin's device 102 also supports eRTT functionality. Henry calls (e.g., in an RTT call, or a normal call upgraded to an RTT call) Yasmin, and Henry's device 100 displays a RTT conversation window with eRTT functionality enabled at 136. Henry attaches (or inserts) a file 142 that includes non-text content (e.g., a digital photo 146) into the RTT message 144, and the file 142 is transmitted in the RTT message 144, in real time, such that Yasmin receives the digital photo 146 successfully, and in real time.

As mentioned, because RTT messaging may be assigned a higher QoS than the QoS assigned to traditional IMS-based messaging services (e.g., SMS text), the resulting communication of the non-text content file 142 via the RTT message 144 may be perceived by the parties of the conversation as being a real-time content exchange, as compared to discernable latency that may be experienced in traditional IMS-based messaging services. Furthermore, the parties of the conversation do not need to "flip" (or navigate) to a messaging application to send the non-text content file 142, and then back to the RTT calling application in order to continue with a RTT conversation via the RTT conversation window. Furthermore, privacy of the non-text content file 142 may be better preserved, as compared to sending the file 142 using standard IMS-based messaging services because the file 142 can be logged as part of the communication session, rather than being stored by a remote server and forwarded to the other UE 102, as is the practice in standard IMS-based messaging services, such as SMS text. Furthermore, if the communication session is terminated (e.g., the RTT call is dropped) before successful transmission of the non-text content file 142, the transmission of the non-text content file 142 is terminated, and Yasmin may not receive the digital photo 146 unless and until Henry re-establishes another communication session and sends the non-text content file 142 again, during that subsequent communication session. Although this may be perceived as a drawback to transmitting non-text content via RTT messages, it goes towards protecting privacy of data, which may be valuable to the parties to a conversation.

Although FIG. 1 shows an example where the non-text content file 142 is sent via the RTT message 144 during an established, active communication session, it is to be appreciated that the exchange of the non-text content file 142 via the RTT message 144 can occur after initiating setup of, and prior to establishing, the communication session at 130. In this case, an early media communication session may be established prior to establishing the communication session at 130. To support this "early" transmission of non-text content via RTT messages during an early media communication session, the capability information 110/112 may include information indicating that the UEs 100 and 102 each support early media, such as eRTT early media, and the SDP offer/answer 120/122, and dedicated bearer that is established at 124, may be directed toward setting up the early media communication session so that non-text content can be exchanged before establishing the communication session via RTT messages (e.g., while the terminating UE 102 is ringing and before the called party answers call at the terminating UE 102).

It is also to be appreciated that the display of the selectable upgrade option at 116 can, additionally or alternatively, occur after a normal voice-based communication session is established. For example, if the user initiates a VoLTE call at 106, the VoLTE call may be established at 130, and the originating UE 100 may display the selectable option to upgrade to a RTT call during the active communication session. In this scenario, the selectable upgrade option may or may not be displayed during setup of the communication session at 116. If displayed during the setup of the communication session at 116, the user of the originating UE 100 may not select the upgrade option, causing the communication session to be established as a normal voice session (e.g., a VoLTE call).

Figure 2:
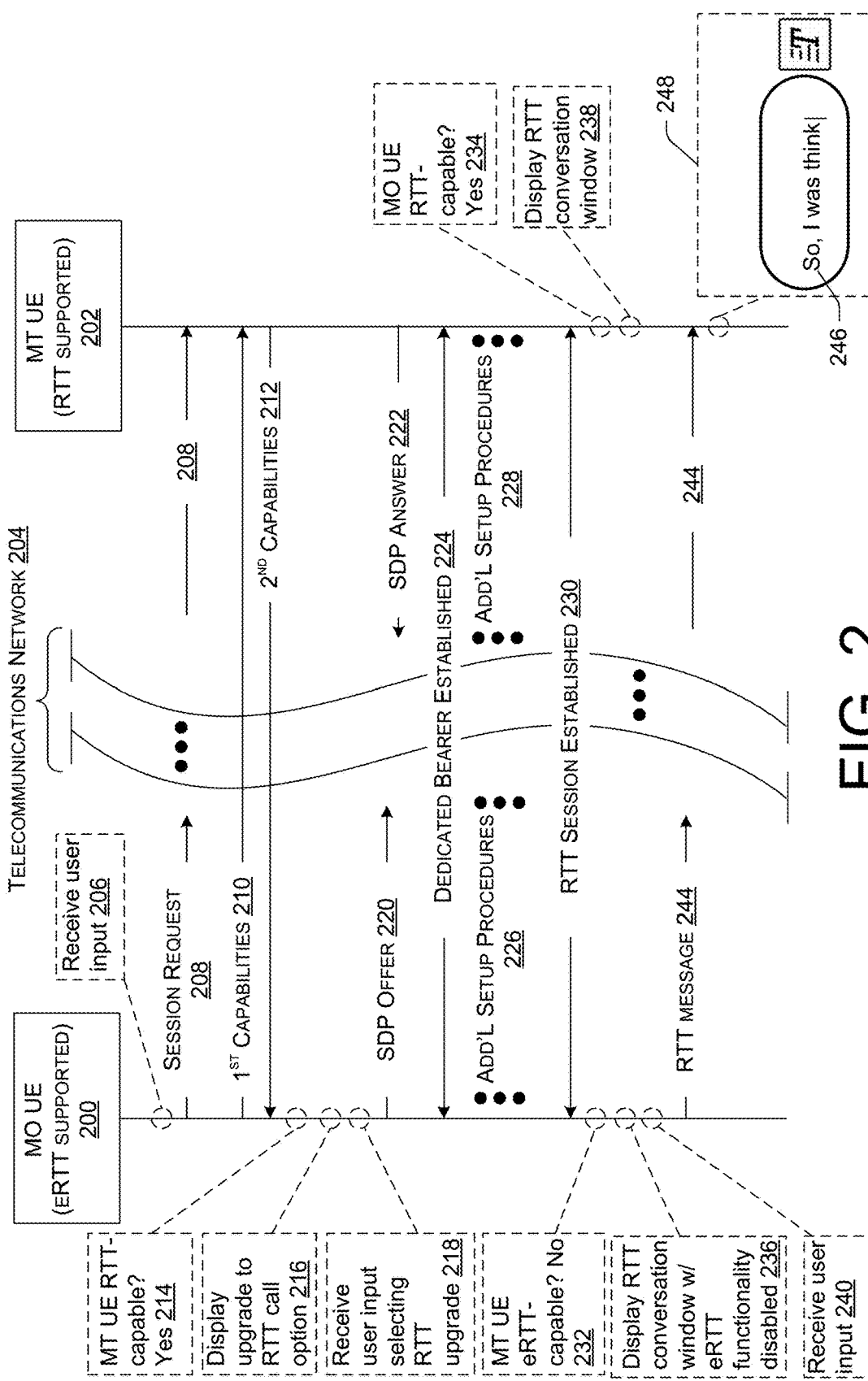
FIG. 2 is a diagram illustrating an originating UE configured to disable eRTT functionality based on capability information received from a terminating UE that is incapable of exchanging non-text content via RTT messages.

FIG. 2 is a diagram illustrating an originating UE 200 configured to disable eRTT functionality based on capability information received from a terminating UE 202 that is capable of exchanging text content, but incapable of exchanging non-text content, via RTT messages. The operations and signaling shown in FIG. 2 may be similar to those described in FIG. 1 (e.g., like reference numerals in each figure may correspond to the same or similar operations). Thus, similar operations and signaling between FIGS. 1 and 2 will not be repeated with respect to FIG. 2 for the sake of brevity.

In FIG. 2, however, the terminating UE 202 is RTT-capable, but is not eRTT-capable, like the terminating UE 102 of FIG. 1. Accordingly, because the terminating UE 202 is at least RTT-capable (i.e., capable of exchanging text content via RTT messages), the communication session can either be requested as a RTT call, or upgraded to a RTT call. As mentioned with respect to FIG. 1, an upgrade from a normal call to a RTT call can occur during setup, or after establishing a normal voice-based communication session at 230.

After a RTT-based communication session is established at 230, the originating UE 200 may, at 232, determine, from the second capability information 212, that the terminating UE 202 is incapable of exchanging non-text content (e.g., incapable of exchanging image content, video content, etc.)

via RTT messages. In response to this determination, the originating UE 200 may, at 236, display a RTT conversation window with eRTT functionality disabled. Disabling eRTT functionality at 236 may include refraining from displaying the user interface element(s) for including non-text content in RTT messages (e.g., user interface elements like the user interface elements 150 shown in FIG. 1), or displaying the user interface element(s) in an unselectable state (e.g., "greyed out") on the display of the originating UE 200 next to the RTT conversation window. Disabling the eRTT functionality indicates to the user of the originating UE 200 that he/she cannot send non-text content via RTT messages.

However, the user may still be able to enter text content into the RTT conversation window. Thus, the originating UE 200 can receive user input at 240 that causes text content 246 to be created or selected for inclusion in a RTT message 244, and the originating UE 200 can send the text content 246 via the RTT message 244 to the terminating UE 202. The text content 246 may be received by the terminating UE 202 and displayed on the terminating UE 202 at 248, in real time.

Thus, FIG. 2 illustrates a signaling flow to disable eRTT functionality on an eRTT-capable device 200 based on capability information 212 associated with a RTT-capable device 202 that does not support eRTT functionality. For example, Henry (associated with the originating UE 200) calls John (associated with the terminating UE 202). Henry's device 200 (an eRTT-capable device) determines that John's device 202 supports RTT, but not eRTT functionality. This determination may be based on the second capability information's 212 omission of a feature tag(s) for eRTT service(s). Henry's call may have originated as an RTT call, or it may have been upgraded from a normal call to a RTT call; the latter shown in FIG. 2. Henry's device 200, at 236, refrains from displaying user interface elements for including non-text content in the RTT message 244, or Henry's device 200 displays the user interface element(s) in an unselectable state next to a RTT conversation window on the device 200. Henry can send text content 246 in the RTT message 244, but cannot send non-text content in the RTT message 244, according to the example of FIG. 2.

It is to be appreciated that, if the terminating UE 202 of FIG. 2 were to not support RTT at all, then this information would be indicated in the second capability information 212, and the upgrade to the RTT call would not be possible in this alternative scenario. Thus, the originating UE 200 may not display the selectable upgrade option at 216 (or the upgrade option may be displayed at 216 in an unselectable state (e.g., "greyed out")) if the terminating UE 202 were a legacy UE that did not support RTT at all. Any communication session established at 230 may thereafter be established as a non-RTT-based session (e.g., a VoLTE call), which means that the RTT conversation window is not displayed at 236, and the UE's 200/202 may be incapable of exchanging RTT messages at all. Alternatively, a UE 202 that is not RTT-capable may be configured to receive text content via a standard messaging application, while the eRTT capable UE 200 sends text content via RTT messages.

Figure 3:
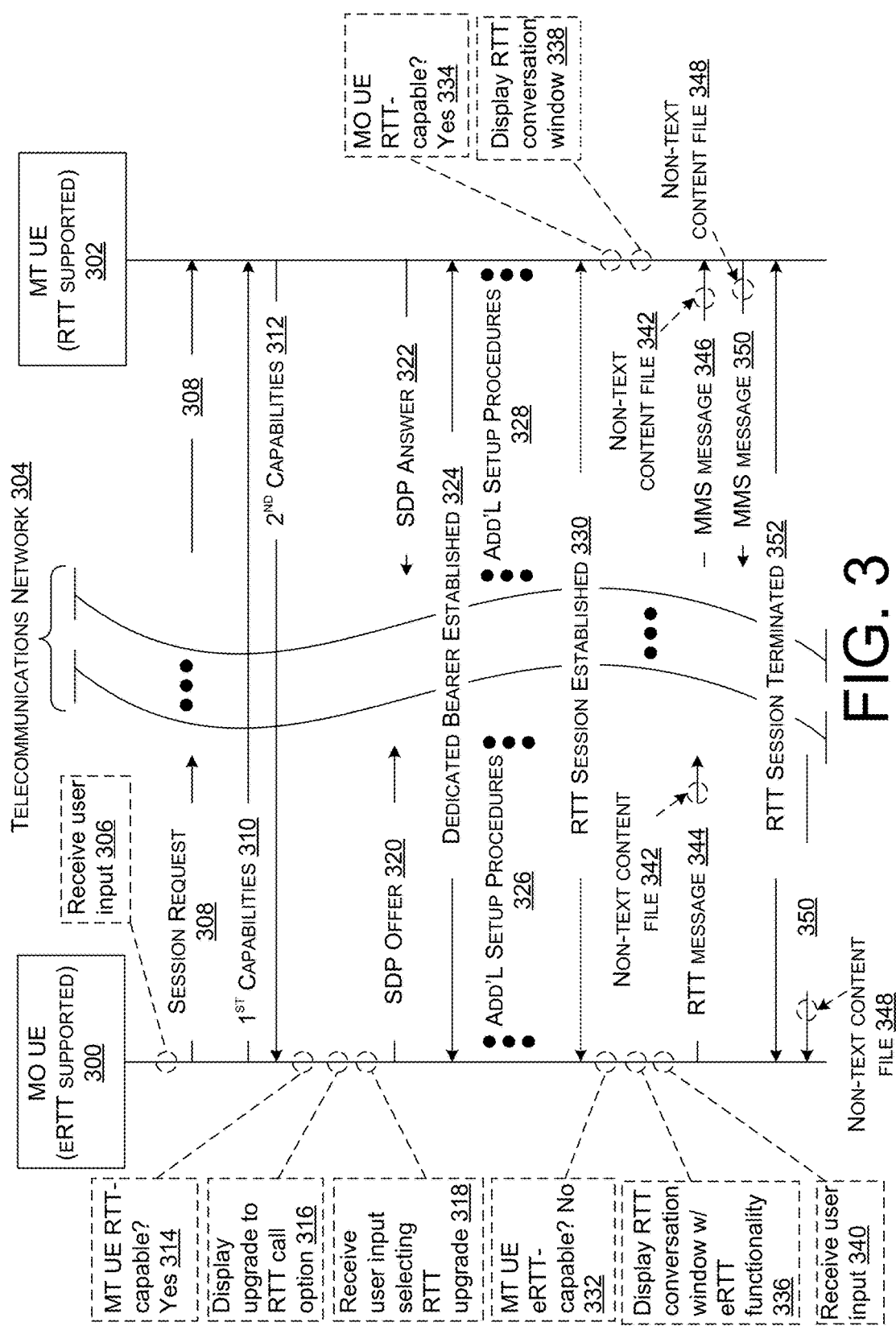
FIG. 3 is a diagram illustrating an originating UE configured to enable eRTT functionality despite capability information received from a terminating UE indicating that the terminating UE is incapable of exchanging non-text content via RTT messages.

FIG. 3 is a diagram illustrating an originating UE 300 configured to enable eRTT functionality despite capability information received from a terminating UE 302 indicating that the terminating UE 302 is incapable of exchanging non-text content via RTT messages. The operations and signaling shown in FIG. 3 may be similar to those described in FIGS. 1 and/or 2 (e.g., like reference numerals in each figure may correspond to the same or similar operations).

Thus, similar operations and signaling between FIGS. 1, 2, and 3 will not be repeated with respect to FIG. 3 for the sake of brevity.

In FIG. 3, like the example of FIG. 2, the terminating UE 302 is RTT-capable, but is not eRTT-capable. Accordingly, because the terminating UE 202 is at least RTT-capable (i.e., capable of exchanging text content via RTT messages), the communication session can either be requested as a RTT call, or upgraded to a RTT call. As mentioned, an upgrade to a RTT call can occur during setup, or after establishing a normal voice-based communication session at 330.

After a RTT-based communication session is established at 330, the originating UE 300 may, at 332, determine, from the second capability information 312, that the terminating UE 302 is incapable of exchanging non-text content (e.g., incapable of exchanging image content, video content, etc.) via RTT messages. In response to this determination, the originating UE 300 may, at 336, display a RTT conversation window with eRTT functionality enabled, similar to the display of the RTT window with eRTT functionality at 136 of FIG. 1. For example, enabling the eRTT functionality at 336 may include displaying the user interface element(s) in the selectable state on the display next to the RTT conversation window (e.g., user interface elements like the user interface elements 150 shown in FIG. 1), such that a user can select the user interface element(s) to include non-text content (e.g., the non-text content file 342) in a RTT message 344. Enabling the eRTT functionality indicates to the user of the originating UE 300 that he/she can send non-text content via RTT messages.

Thus, the originating UE 300 can receive user input at 340 that causes a non-text content file 342 to be created or selected for inclusion (e.g., insertion) in a RTT message 344, and the originating UE 300 can send the non-text content file 342 via the RTT message 344 to the terminating UE 302.

In the example of FIG. 3, however, because the terminating UE 302 is incapable of exchanging non-text content via RTT messages (i.e., the terminating UE 302 can exclusively exchange text content via RTT messages), the non-text content file 342 may be received by the terminating UE 302 via a standard message 346 (e.g., a MMS message) that uses a standard messaging application that is different that an application executing on the UEs 300 and 302 for the RTT-based communication session established at 330. That is, the respective UEs 300 and 302 may execute a RTT calling application to support the active RTT-based communication session where a screen displays in-call options and information, as well as a RTT conversation window. However, in order to receive the non-text content file 342, the user of the RTT-capable terminating UE 302 may be required to switch (or navigate to) a messaging application, such as a MMS messaging application, outside of the context of the screen that supports the active RTT-based communication session. Once the called party navigates to a messaging application that received the message 346, the non-text content file 342 can be displayed on the terminating UE 302.

FIG. 3 also shows an example where the called party sends a non-text content file 348 to the calling party using the standard messaging application on the terminating UE 302, which causes the non-text content file 348 to be send via a standard message 350 (e.g., a MMS message 350). In the midst of transmitting the message 350, however, the RTT-based communication session is terminated at 352 (e.g., the RTT call is dropped) before the non-text content file 348 is received at the originating UE 300. In this case, FIG. 3 shows that the non-text content file 348 may be received by the originating UE 300, after termination of the RTT-based communication session at 352, via a standard messaging application (e.g., via the standard message 350, such as a MMS message). If the direction of transmission were the opposite direction to that shown in FIG. 3, any non-text content sent from the originating UE 300 and not yet received by the terminating UE 302 before termination of the RTT-based communication session may be lost (e.g., not received by the terminating UE 302 at all).

Thus, FIG. 3 illustrates a signaling flow to enable eRTT functionality on an eRTT-capable device 300 despite capability information 312 associated with a RTT-capable device 302 indicating that the device 302 does not support eRTT functionality. For example, Henry (associated with the originating UE 300) calls John (associated with the terminating UE 302). Henry's device 300 (an eRTT-capable device) determines that John's device 302 supports RTT, but not eRTT functionality. This determination may be based on the second capability information's 312 omission of a feature tag(s) for eRTT service(s). Henry's call may have originated as an RTT call, or it may have been upgraded from a normal call to a RTT call; the latter shown in FIG. 3. Henry's device 300 displays a RTT conversation window with eRTT functionality enabled at 336. Henry attaches (or inserts) a file 342 that includes non-text content (e.g., a digital photo) into the RTT message 344. The file 342 transmitted in the RTT message 344 by Henry's device 300 is received by John's device using a standard messaging application (e.g., MMS, RCS, etc.). Henry's device 300 displays the non-text content that is exchanged during the communication session as part of the RTT conversation (i.e., within the RTT conversation window), while John's device 302 receives text content of the RTT conversation in a RTT conversation window of a RTT calling application, and receives non-text content in a separate window for a standard messaging application. Henry's device 300 better protects the privacy of any content exchanged during the communication session because RTT messaging is utilized in lieu of standard messaging on Henry's device 300. For instance, both text content and non-text content is transmitted from Henry's device 300 exclusively during the active communication session, and will end incomplete transmission if the communication session is terminated before receipt at John's device 302. Conversely, when the communication session is terminated, John's device 302 may continue to transmit unfinished content, the unfinished content being sent as a standard message 350 to Henry's device 300 after the session is terminated. Henry's device 300 may not track the unfinished content as eRTT content.

Figure 4:
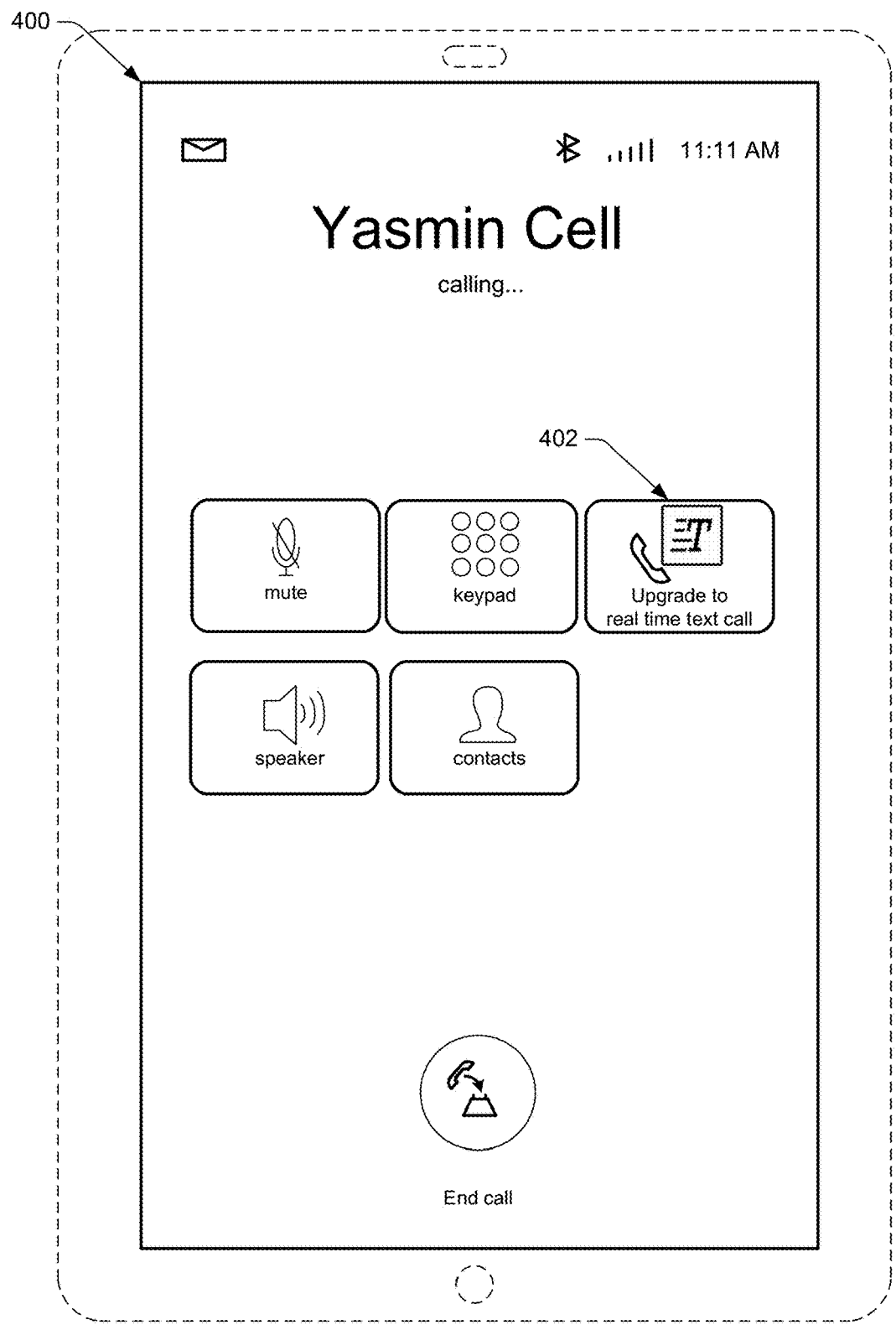
FIG. 4 illustrates an example user interface of an originating UE that is displayed during setup of a communication session, the user interface presenting, based on capability information received from a terminating UE, a selectable option to upgrade the communication session to a RTT call that supports the exchange of RTT messages during the communication session.

FIG. 4 illustrates an example user interface 400 of an originating UE 100/200/300 that is displayed during setup of a communication session. The user interface 400 may be invoked, for example, by a user of the originating UE 100/200/300 having opened a voice calling application on the originating UE 100/200/300, dialed a number, and selected an element on a touch screen of the originating UE 100/200/300 that causes a session request 108/208/308 to be sent to the appropriate UE 102/202/302 of the called party. For example, the user interface 400 may represent a screen that is presented on the originating UE 100/200/300 in response to receiving the user input 106/206/306, but prior to establishing a communication session. FIG. 4 shows that the calling party is in the midst of calling a phone number associated with the contact "Yasmin Cell," and the called party (e.g., Yasmin) has not yet answered.

In the example of FIG. 4, the user selected a normal calling function (as opposed to an RTT calling function) to invoke the user interface 400. This may be the case where a previous screen presented a RTT calling function (if capabilities are exchanged between the originating UE 100/200/300 and the terminating UE 102/202/302 prior to initiating the setup of the communication session) and the user of the originating UE 100/200/300 did not select the RTT calling function, but, instead, selected a normal calling function. Alternatively, capabilities may not have been exchanged before the user selected a calling function, and in this case, the user may not be presented with a RTT calling function option.

FIG. 4 shows that the user interface 400 may include a selectable option 402 to upgrade the communication session to a RTT call that supports the exchange of RTT messages during the communication session. The selectable option 402 may sometimes be referred to as a "selectable upgrade option" 402, accordingly. The selectable upgrade option 402 may be presented during the setup of a communication session on the originating UE 100/200/300 for every call, and may be presented in a selectable state if the capability information 112/212/312 of the terminating UE 102/202/302 indicate that the terminating UE 102/202/302 is a RTT-capable device. If the capability information 112/212/312 of the terminating UE 102/202/302 indicates that the terminating UE 102/202/302 is not RTT-capable (i.e., incapable of exchanging text content via RTT messages), the selectable upgrade option 402 may be presented in an unselectable state (e.g., "greyed out"), or the originating UE 100/200/300 may refrain from displaying the selectable upgrade option 402. In addition, the originating UE 100/200/300 may be configured to display the selectable upgrade option 402 after the communication session is established in addition to, or instead of, displaying the selectable upgrade option 402 during the setup of the communication session, as shown in FIG. 4.

Upon selection of the selectable upgrade option by a user of the originating UE 100/200/300, the originating UE 100/200/300 may initiate setup procedures in an effort to establish a RTT-based communication session (e.g., a RTT call). This may involve a SDP offer/answer and dedicated bearer establishment that is directed to a RTT media stream for the to-be-established RTT-based communication session.

FIG. 5 illustrates an example user interface 500 of an originating UE 100/200/300 that is displayed during an established communication session. The user interface 500 may be invoked, for example, in response to a called party accepting (e.g., answering) the request to establish the communication session as a RTT-based communication session.

The user interface 500 may present a RTT conversation window 502, such as a content entry field to enter or add text and/or non-text content to a RTT conversation. Upon insertion into the RTT conversation window 502, the content is transmitted, in real-time, to the terminating UE 102/202/302, as described herein. For example, a user may type user-generated text content 504, in which case the RTT conversation window 502 acts as a free form text input mechanism. The user may provide touch input to a soft keyboard 506 and/or using a microphone as an input mechanism with voice recognition. Thus, a user of the originating UE 100/200/300 is able to create user-generated text content using the user interface 500.

The user interface 500 also may present one or more user interface elements 508 next to the RTT conversation window 502, such as below, beside, above, or anywhere that is adjacent to the RTT conversation window 502 in the user interface 500. In the example of FIG. 5, a plurality of user interface elements 508(1)-(7) (collectively 508) are displayed next to the RTT conversation window 502, below the RTT conversation window 502 to facilitate easy selection of the user interface elements 508 by a user. Although seven user interface elements 508 are shown in FIG. 5, it is to be appreciated that any number of user interface elements, smaller or larger than seven, may be presented without departing from the basic characteristics of the techniques and systems described herein.

The individual user interface elements may correspond to a type of non-text content, a category of non-text content, and/or a means of obtaining non-text content. For example, a first user interface element 508(1) is shown as a camera icon that, upon selection, allows a user to utilize an image capture mechanism (e.g., a camera) of the UE 100/200/300 to create image content and/or video content. Once captured, the user-created image or video content is inserted into the RTT conversation window 502 and sent via a RTT message to the terminating UE 102/202/302. A second user interface element 508(2) is shown as a photo icon that, upon selection, allows a user to select particular image and/or video content from available image and/or video content (e.g., available to the UE 100/200/300 from an image/video library stored in local memory, or remote memory accessible to the UE 100/200/300. A third user interface element 508(3) is shown as a geolocation icon that, upon selection, determines the geographic location of the UE 100/200/300, and inserts a digital map showing the determined geographic location of the UE 100/200/300 in the RTT conversation window 502. A fourth user interface element 508(4) is shown as a microphone icon that, upon selection, allows a user to record audio using a microphone(s) of the UE 100/200/300, and upon doing so, recorded audio content (e.g., an audio clip) may be inserted into the RTT conversation window 502 and sent to the terminating UE 102/202/302. A fifth user interface element 508(5) is shown as a "contacts" icon that, upon selection, allows a user to select from existing contacts stored in local memory of the UE 100/200/300 or remote memory accessible to the UE 100/200/300, and when a contact(s), the a file with the contact(s) is inserted into the RTT conversation window 502 and sent to the terminating UE 102/202/302. A sixth user interface element 508(6) is shown as a calendar icon that, upon selection, allows a user to select dates and times, and/or events, on a personal calendar, and when selected, the a file with the calendar information is inserted into the RTT conversation window 502 and sent to the terminating UE 102/202/302. A seventh user interface element 508(7) is shown as a "file attachment" icon that, upon selection, allows a user to select a digital file, and when selected, the file is inserted into the RTT conversation window 502 and sent to the terminating UE 102/202/302. These user interface elements 508 are merely provided as examples for illustrative purposes.

When eRTT functionality is enabled, as described herein, some or all of the user interface elements 508 can be displayed next to the RTT conversation window 502 in a selectable state. For example, when capability information 112/212/312 of the terminating UE 102/202/302 includes a feature tag that indicates all types of non-text content can be exchanged with the terminating UE 102/202/302, all of the user interface elements 508 may be displayed in a selectable state. Alternatively, if multiple feature tags corresponding to individual types or categories of non-text content are included in the capability information 112/212/312 of the terminating UE 102/202/302, the user interface elements 508 corresponding to the feature tags included in the capability information may be independently enabled. FIG. 5 illustrates this example because the third user interface element 508(3) corresponding to the geolocation content is displayed in an unselectable state, as are the user interface elements 508 corresponding to the contacts content, and the calendar content, while the remaining user interface elements 508 are displayed in a selectable state. Of course, as described herein, these "disabled" eRTT user interface elements 508 may not be displayed at all, instead of displaying them in an unselectable (e.g., "greyed out") state. If the capability information 112/212/313 of the terminating UE 102/202/302 indicated that the terminating UE 102/202/302 was incapable of exchanging non-text content (i.e., RTT-capable but not eRTT capable), the user interface elements 508 may not be displayed at all, or they may be displayed in an unselectable state to indicate to the user of the originating UE 100/200/300 that eRTT functionality is disabled for this particular communication session.

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 6:
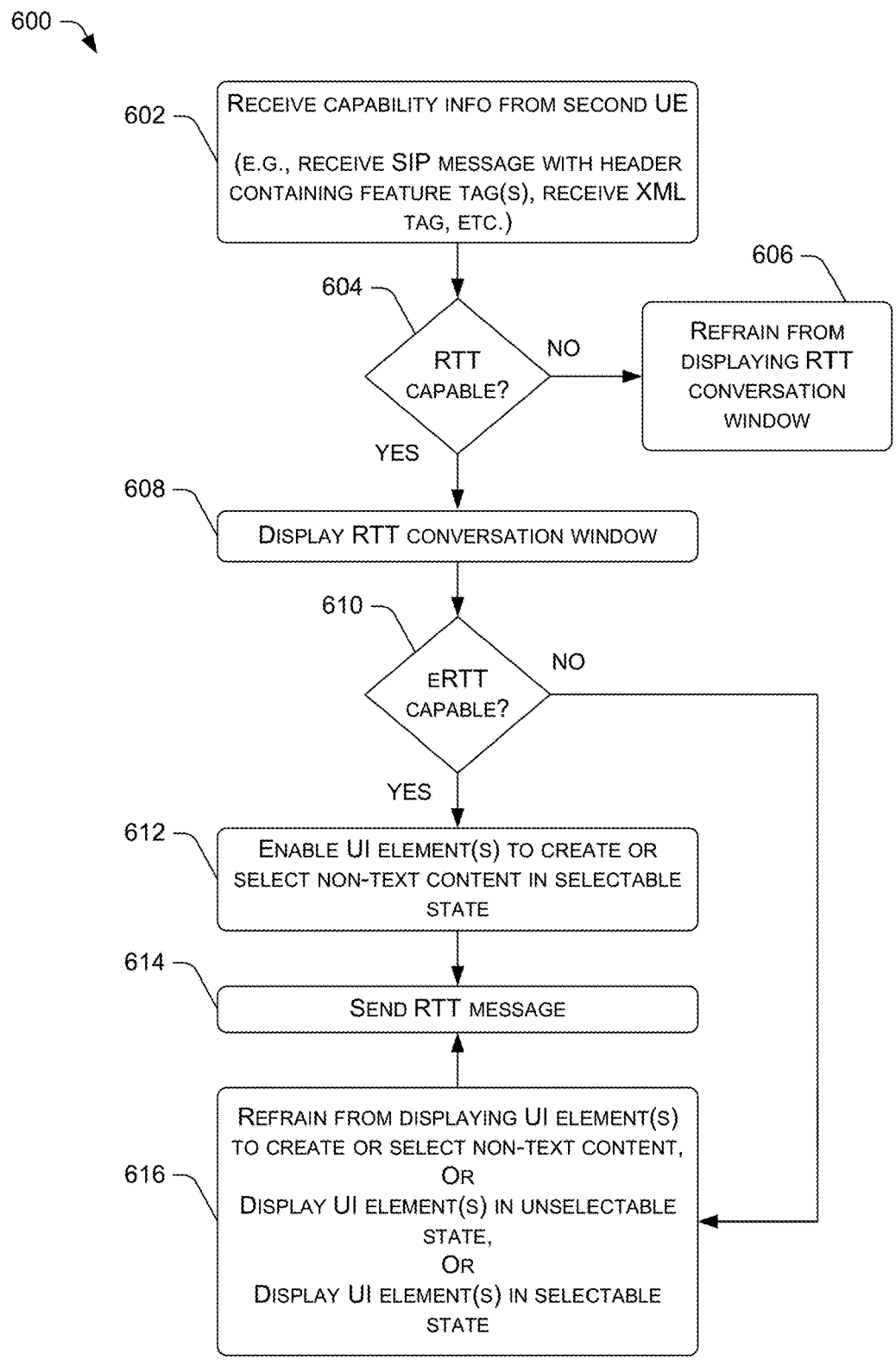
FIG. 6 illustrates a flowchart of an example process for enabling or disabling eRTT functionality on a first UE based on capability information received from a second UE, and sending a RTT message from the first UE to the second UE.

FIG. 6 illustrates a flowchart of an example process 600 for enabling or disabling eRTT functionality on a first UE based on capability information received from a second UE, and sending a RTT message from the first UE to the second UE. The process 600 may be implemented by an originating UE 100/200/300 or a terminating UE 102/202/302. The process 600 is described, by way of example, with reference to the previous figures.

At 602, a first UE may receive, from a second UE over a telecommunications network 104/204/304, capability information indicating whether the second UE is capable of exchanging text content and/or non-text content via RTT messages. The first UE can either be an originating UE 100/200/300 or a terminating UE 102/202/302. For ease of explanation, assume that the first UE is an originating UE 100/200/300 and that the capability information received at 602 is the capability information 112/212/312 associated with the terminating UE 102/202/302. Receiving the capability information 112/212/312 at 602 may include receiving, during setup of a communication session involving the first UE and the second UE, a SIP message (e.g., a SIP OPTIONS message) with a header that contains a feature tag(s) indicating that the second UE 102/202/302 is capable of exchanging the non-text content via the RTT messages. In some cases, as described herein, this may include receiving multiple feature tags, such as a first feature tag corresponding to a first type of non-text content (e.g., image/video content) and a second feature tag corresponding to a second type of non-text content (e.g., geolocation content), both of which the second UE 102/202/302 is capable of exchanging via RTT messages. Capability information received at 602 may additionally, or alternatively include an XML tag to indicate that the second UE 102/202/302 is capable of exchanging the non-text content via the RTT messages. Furthermore, it is to be appreciated that the receiving of the capability information at block 602 can occur before, during, or after setup of a communication session, as described herein.

At 604, a determination may be made as to whether the capability information 112/212/312 indicates that the second UE 102/202/302 is capable of exchanging at least text content via RTT messages (i.e., that the second UE 102/202/302 is RTT-capable). If, at 604, it is determined that the second UE 102/202/302 is incapable of exchanging text content via RTT messages, the process 600 follows the "no" route to 606, where the first UE 100/200/300 refrains from displaying a RTT conversation window, such as the RTT conversation window 502 of FIG. 5.

If, at 604, it is determined that the second UE 102/202/302 is capable of exchanging text content via RTT messages (i.e., is RTT-capable), the process 600 follows the "yes" route to 608, where the first UE 100/200/300 displays a RTT conversation window 502 on a display of the first UE 100/200/300.

At 610, a determination may be made as to whether the capability information 112/212/312 indicates that the second UE 102/202/302 is capable of exchanging non-text content via RTT messages (i.e., that the second UE 102/202/302 is eRTT-capable). If, at 610, it is determined that the second UE 102/202/302 is capable of exchanging non-text content via RTT messages, the process 600 follows the "yes" route to 612, where the first UE 100/200/300 displays a user interface element(s) 508 in a selectable state on the display next to the RTT conversation window 502. The user interface element(s) 508 displayed at 612, upon selection, allows a user of the first UE 100/200/300 to create new non-text content, or select particular non-text content from available non-text content, for inclusion in a RTT message 144/244/344. For example, the user may be able to select the user interface element 508 to select a digital photo from a library of digital photos.

It is to be appreciated that, when multiple feature tags are included in the capability information 112/212/312 received at block 602, each corresponding to a different type or category of non-text content, the user interface elements 508 corresponding to the types or categories of content for those feature tags may be displayed in a selectable state, while other user interface elements 508 may not be enabled (i.e., not displayed, or displayed but not selectable) if their corresponding feature tags are not included in the capability information 112/212/312. This is shown in FIG. 5, by way of example.

At 614, the first UE 100/200/300 may send, over the telecommunications network 104/204/304, the RTT message 144/244/344 to the second UE 102/202/302, which may include non-text content if block 612 is performed during the process 600.

If, at 610, it is determined that the second UE 102/202/302 is incapable of exchanging non-text content via RTT messages (i.e., is not eRTT-capable), the process 600 follows the "no" route from 610 to 616, where the first UE 100/200/300 may either (i) refrain from displaying the user interface element(s) 508, (ii) display the user interface element(s) 508 in an unselectable state on the display next to the RTT conversation window 502, or (iii) display the user interface element(s) 508 in the selectable state on the display next to the RTT conversation window 502.

If block 616 is performed before block 614, the RTT message 144/244/344 sent at block 614 may not include non-text content when eRTT functionality is disabled, or may include non-text content when eRTT functionality is enabled. Also, as described herein, sending non-text content via the RTT message at block 614 may occur after establishing a communication session, or possibly prior to establishing the communication session, such as during setup of the communication session as part of an early media communication session. Furthermore, the non-text content may be sent via the RTT message at block 614 with a same QoS as voice data during a communication session.

Figure 7:
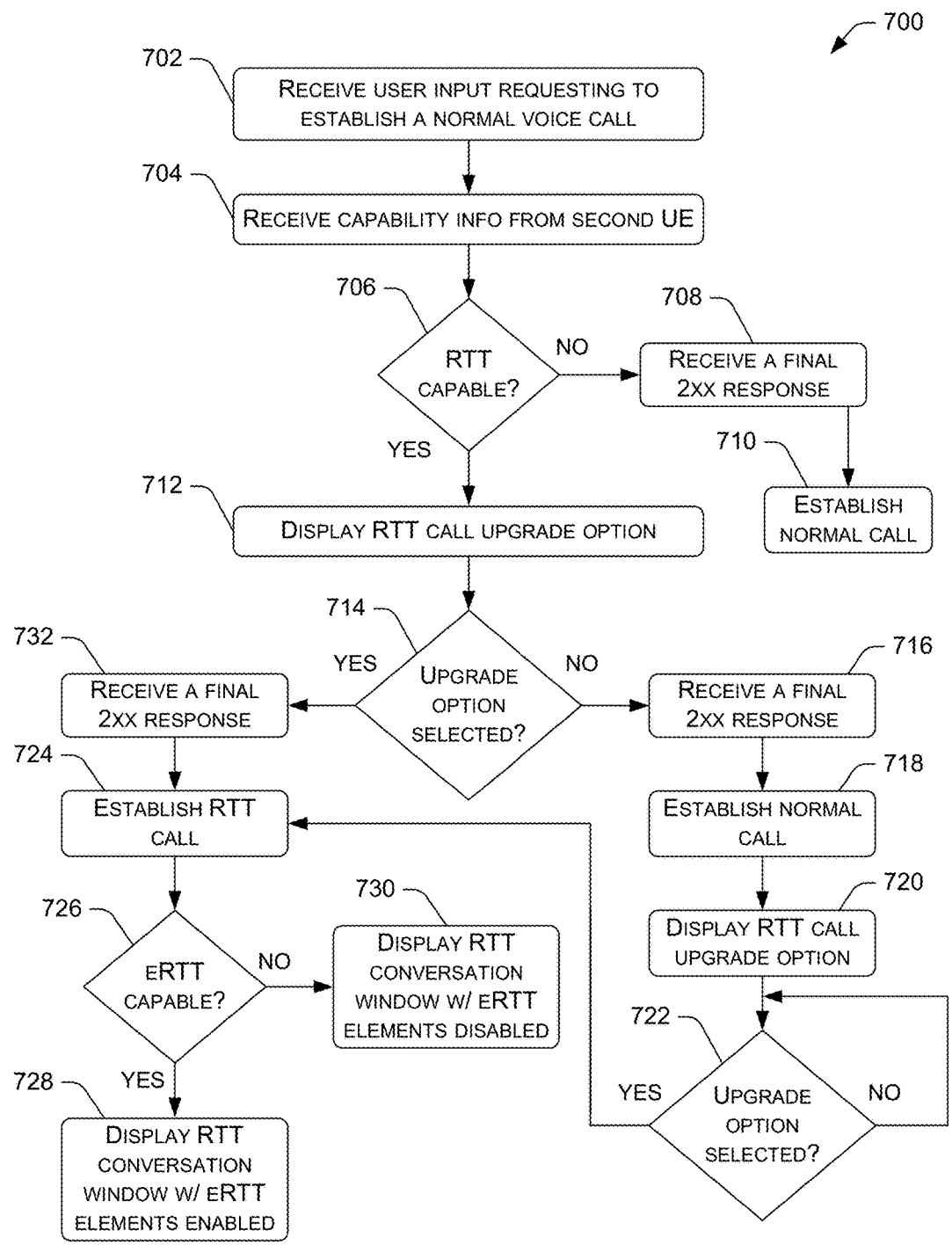
FIG. 7 illustrates a flowchart of an example process for a first UE to receive capability information from a second UE during setup of a communication session, display a selectable option to upgrade the communication session to a RTT call based on the capability information, and enable or disable eRTT functionality based on the capability information.

FIG. 7 illustrates a flowchart of an example process 700 for a first UE to receive capability information from a second UE during setup of a communication session, display a selectable option to upgrade the communication session to a RTT call based on the capability information, and enable or disable eRTT functionality based on the capability information. The process 700 may be implemented by an originating UE 100/200/300. The process 700 is described, by way of example, with reference to the previous figures.

At 702, a first UE 100/200/300 may receive user input requesting to establish a communication session as a voice call that does not support an exchange of the RTT messages during the communication session.

At 704, first UE 100/200/300 may receive, from a second UE 102/202/302 over a telecommunications network 104/204/304, capability information 112/212/312 indicating whether the second UE 102/202/302 is capable of exchanging text content and/or non-text content via RTT messages. The operation(s) performed at block 704 may be similar to those performed at block 602 of the process 600 of FIG. 6.

At 706, a determination may be made as to whether the capability information 112/212/312 indicates that the second UE 102/202/302 is capable of exchanging at least text content via RTT messages (i.e., that the second UE 102/202/302 is RTT-capable). The operation(s) performed at block 706 may be similar to those performed at block 604 of the process 600 of FIG. 6.

If, at 706, it is determined that the second UE 102/202/302 is incapable of exchanging text content via RTT messages, the process 700 follows the "no" route to 708, where the first UE 100/200/300 receives a final 2xx response indicating a successful setup of the requested communication session, and at 710, a normal voice-call is established.

If, at 706, it is determined that the second UE 102/202/302 is capable of exchanging text content via RTT messages, the process 700 follows the "yes" route to 712, where the first UE 100/200/300 displays a selectable option 402 to upgrade the communication session to a RTT call that supports the exchange of the RTT messages during the communication session.

At 714, a determination is made as to whether the user has selected to selectable upgrade option 402. If the user does not select the upgrade option 402, the process 700 follows the "no" route from block 714 to block 716, where the first UE 100/200/300 receives a final 2xx response indicating a successful setup of the requested communication session, and at 718, a normal voice-call is established.

At 720, the first UE 100/200/300 may display the selectable upgrade option 402 during the active communication session, and may monitor selection of this upgrade option 402 at 722 during the active communication session. If, at 722, it is determined that the user does not select the upgrade option 402 during the active communication session, the process 700 iterates at 722 by following the "no" route from block 722, and continuing to monitor selection of the upgrade option 402 during the active communication session.

If and when the user selects the upgrade option 402 during the active communication session, this is determined at block 722, causing the process 700 to follow the "yes" route from block 722 to block 724, where an RTT call is established by upgrading the normal voice call (e.g., a VoLTE call) to a RTT call.

At 726, a determination may be made as to whether the capability information 112/212/312 indicates that the second UE 102/202/302 is capable of exchanging non-text content via RTT messages (i.e., that the second UE 102/202/302 is eRTT-capable). The operation(s) performed at block 726 may be similar to those performed at block 610 of the process 600 of FIG. 6. If, at 726, it is determined that the second UE 102/202/302 is capable of exchanging non-text content via RTT messages, the process 700 follows the "yes" route to 728, where a RTT conversation window 502 is displayed on the first UE 100/200/300 with eRTT elements 508 enabled. This may include enabling some or all elements 508 of available user interface elements 508 to allow a user to include non-text content in a RTT message.

If, on the other hand, it is determined, at 726, that that the second UE 102/202/302 is incapable of exchanging non-text content via RTT messages, the process 700 follows the "no" route from block 726 to 730, where a RTT conversation window 502 is displayed on the first UE 100/200/300 with eRTT elements 508 disabled (e.g., not displayed, displayed in an unselectable state, etc.).

Another way to get to block 724 to perform the subsequent blocks is by receiving an indication at block 714 that the user selected the upgrade option 402 during setup of the normal voice communication session. In this case, the process 700 follows the "yes" route from block 714 to block 732, where the first UE 100/200/300 receives a final 2xx response indicating successful setup of the communication session, and establishes the communication session as a RTT call at block 724.

Figure 8:
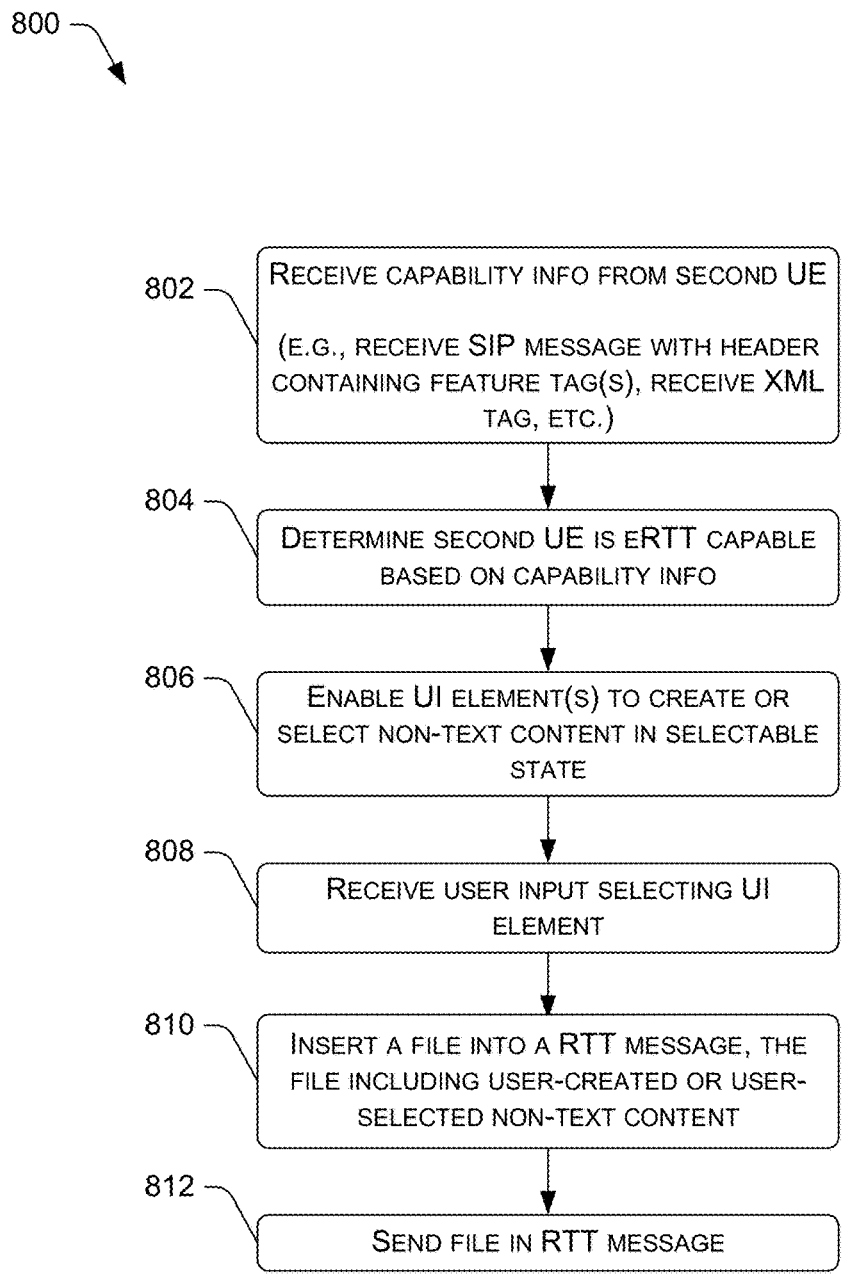
FIG. 8 illustrates a flowchart of an example process for enabling eRTT functionality on a first UE based on capability information received from a second UE, inserting a file into a RTT message, and sending the file in the RTT message, wherein the file includes user-created or user-selected non-text content.

FIG. 8 illustrates a flowchart of an example process 800 for enabling eRTT functionality on a first UE based on capability information received from a second UE, inserting a file into a RTT message, and sending the file in the RTT message, wherein the file includes user-created or user-selected non-text content. The process 800 may be implemented by an originating UE 100/200/300 or a terminating UE 102/202/302. The process 800 is described, by way of example, with reference to the previous figures.

At 802, a first UE may receive, from a second UE over a telecommunications network 104/204/304, capability information indicating whether the second UE is capable of exchanging text content and/or non-text content via RTT messages. The first UE can either be an originating UE 100/200/300 or a terminating UE 102/202/302. For ease of explanation, assume that the first UE is an originating UE 100/200/300 and that the capability information received at 802 is the capability information 112/212/312 associated with the terminating UE 102/202/302. The operation(s) performed at 802 may be similar to those performed at block 602 of the process 600 of FIG. 6.

At 804, the first UE 100/200/300 may determine, from the capability information 112/212/312 received at block 802, that the second UE 102/202/302 is capable of exchanging non-text content via RTT messages (i.e., that the second UE 102/202/302 is eRTT-capable). The operation(s) performed at block 804 may be similar to those performed at block 610 of the process 600 of FIG. 6.

At 806, the first UE 100/200/300 displays a user interface element(s) 508 in a selectable state on the display next to a RTT conversation window 502. The operation(s) performed at block 806 may be similar to those performed at block 612 of the process 600 of FIG. 6.

At 808, the first UE 100/200/300 may receive user input indicating that a user interface element 508 displayed at block 806 is selected. For example, the user may select the element 508(1) to take a picture using a camera of the first UE 100/200/300. This may involve additional user input to take a picture, or to select non-text content from available non-text content.

At 810, the first UE 100/200/300 may insert a file 142/342 into the RTT message 144/344, the file 142/342 including non-text content that was created, or selected, by the user of the first UE 100/200/300.

At 812, the first UE 100/200/300 may send, over the telecommunications network 104/204/304, the file 142/342 via the RTT message 144/244/344 to the second UE 102/202/302. The operation(s) performed at block 812 may be similar to those performed at block 614 of the process 600 of FIG. 6.

Figure 9:
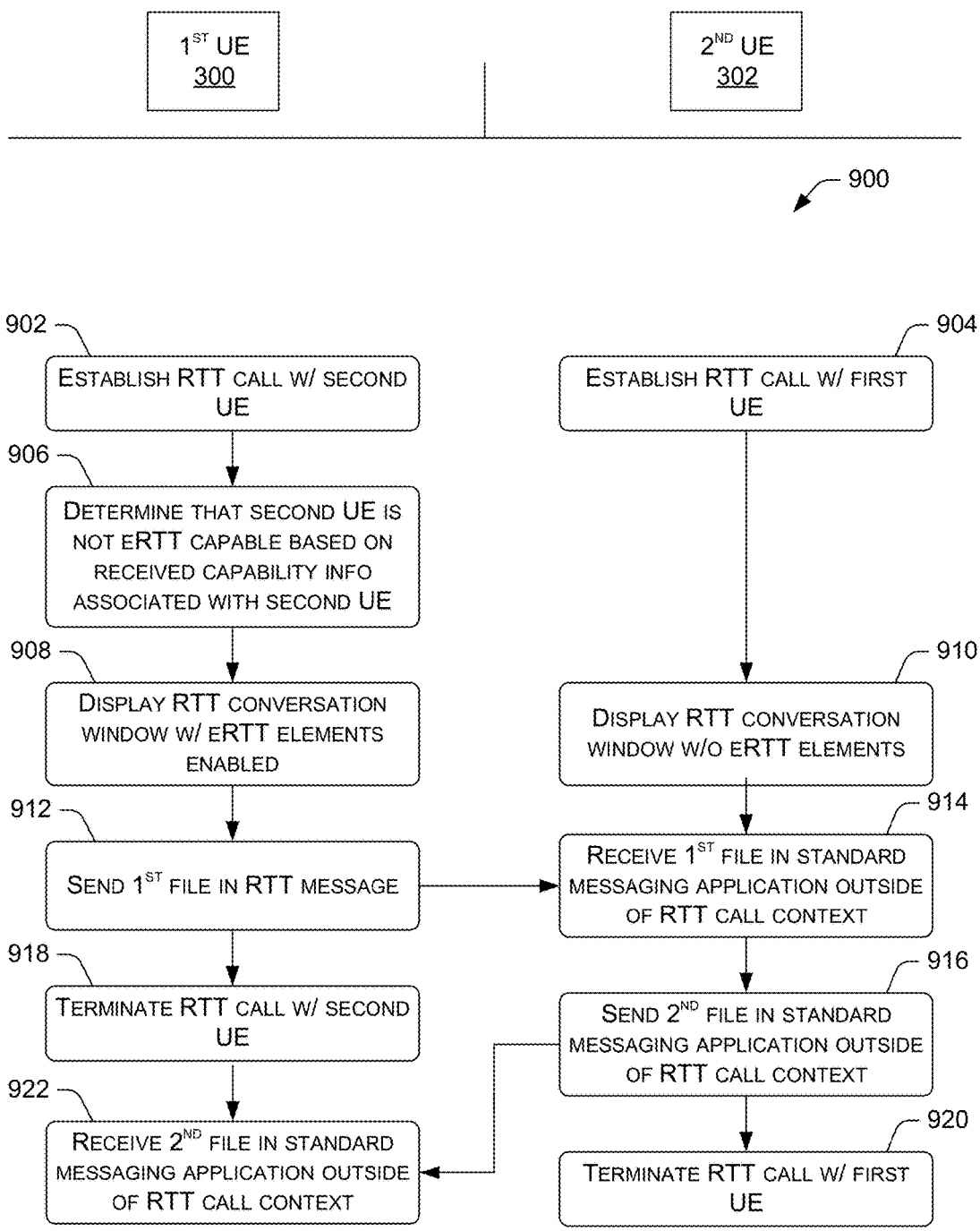
FIG. 9 illustrates a flowchart of an example process for enabling eRTT functionality despite capability information received from a terminating UE indicating that the terminating UE is capable of exchanging text content, but incapable of exchanging non-text content, via RTT messages, and exchanging non-text content between the UEs.

FIG. 9 illustrates a flowchart of an example process 900 for enabling eRTT functionality despite capability information received from a terminating UE indicating that the terminating UE is capable of exchanging text content, but incapable of exchanging non-text content, via RTT messages, and exchanging non-text content between the UEs. The process 900 is shown as being implemented in part by a first UE 300 that is eRTT capable and in part by a second UE 302 that is RTT capable, but not eRTT capable. The process 900 is described, by way of example, with reference to the previous figures.

At 902, the first UE 300 may establish a RTT call with a second UE 302. Likewise, at 904, the second UE 302 may establish the RTT call with the first UE 300.

At 906, the first UE 300 may determine, from capability information 312 associated with the second UE 302, that the second UE is incapable of exchanging non-text content via RTT messages (i.e., not eRTT capable).

At 908, the first UE 300 may display a RTT conversation window 502 with eRTT elements 508 enabled. This may include enabling some or all elements 508 of available eRTT elements 508. Meanwhile, at 910, the second UE 302 may display its own RTT conversation window 502 w/o eRTT elements because the second UE 302, in this example, is not eRTT capable.

At 912, the first UE 300 may send a first file 342 including non-text content in a RTT message 344, over a telecommunications network 304, to the second UE 302.

At 914, the second UE 302 may receive the first file 342 in a messaging application executing on the second UE 302 that is different from an application that is executing for the established RTT call. For example, the file 342 may be received by the second UE 302 in a MMS messaging application executing on the second UE 302 outside of the context of a RTT calling application that displays the RTT conversation window 502 on the second UE 302.

At 916, the second UE may send a second file 348 using the standard messaging application that is different from the RTT calling application. Meanwhile, the RTT call may be terminated at 918, such as from the user of the first UE 300 hanging up the RTT call, or for some other reason (e.g., poor radio conditions, etc.). The termination of the RTT call may occur prior to receipt of the second file 348 at the first UE 300.

At 920, after transmission of the second file 348 was started at block 916, and as a result of the termination of the RTT call at block 918, the RTT call is terminated from the perspective of the second UE 302.

At 922, the first UE 300 may receive the second file 348 after terminating the RTT call at block 918, wherein the second file 348 is received by the first UE 300 in a messaging application executing on the first UE 300 that is different from an application that is executing for the established RTT call. For example, the second file 348 may be received by the first UE 300 in a MMS messaging application executing on the first UE 300 outside of the context of a RTT calling application that displays the RTT conversation window 502 on the first UE 300.

Thus, the process 900 enables eRTT functionality on an eRTT-capable device, even when one of the devices is not eRTT-capable. It is to be appreciated that a process similar to the process 900 may be carried out between an eRTT-capable device and a device that is neither RTT-capable nor eRTT-capable, in the context of a normal voice call (e.g., a VoLTE call).

Figure 10:
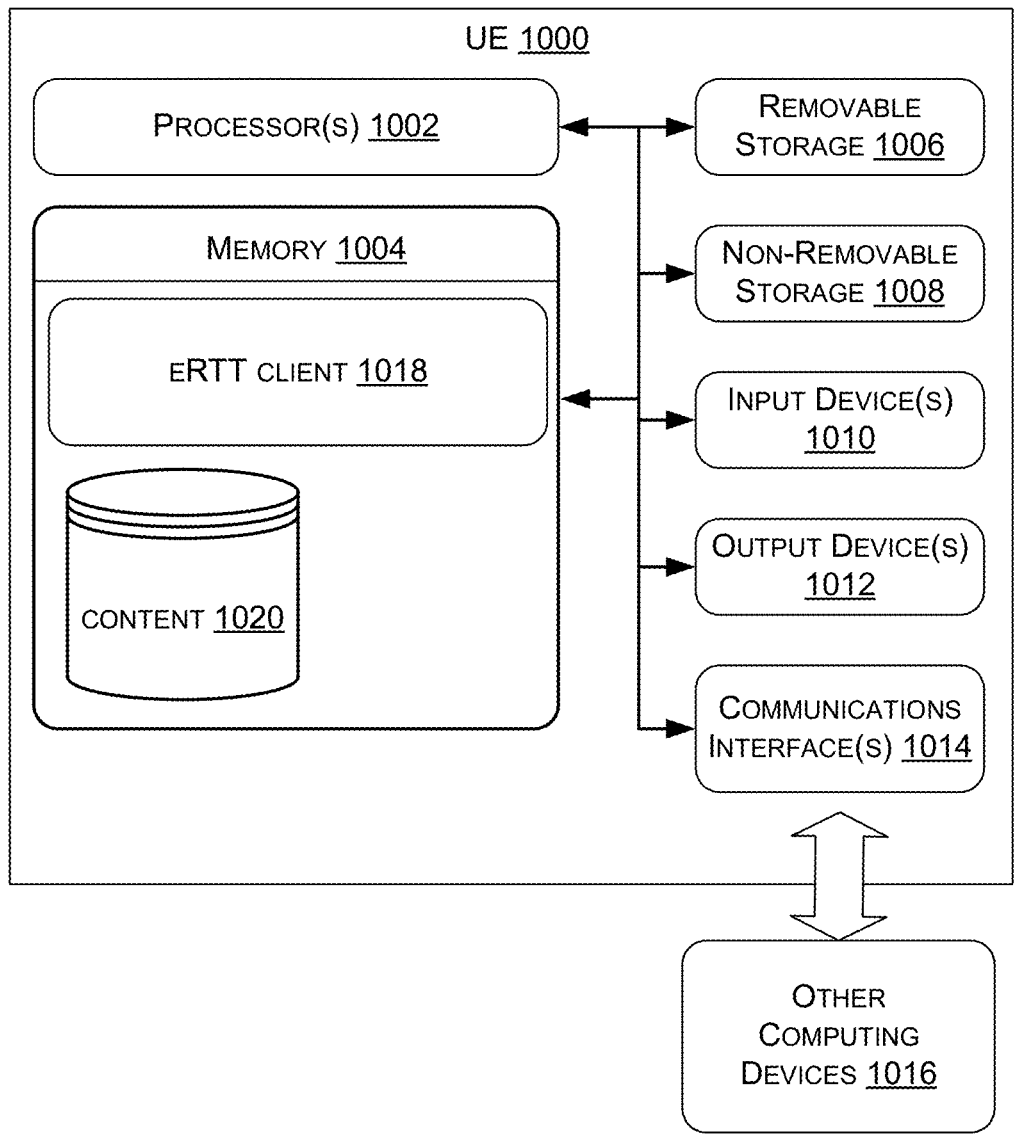
FIG. 10 is a block diagram of an example UE configured to enable or disable eRTT functionality based on capability information received from another UE, the eRTT functionality, when enabled, allowing a user of the example UE to send non-text content in a RTT message, over a telecommunications network.

FIG. 10 is a block diagram of an example UE 1000 configured to enable or disable eRTT functionality based on capability information received from another UE. The UE 1000 may be representative of the UE's 100/102/200/300 described herein.

As shown, the UE 1000 may include one or more processors 1002 and one or more forms of computer-readable memory 1004. The UE 1000 may also include additional storage devices. Such additional storage may include removable storage 1006 and/or non-removable storage 1008.

The UE 1000 may further include input devices 1010 and output devices 1012 communicatively coupled to the processor(s) 1002 and the computer-readable memory 1004. The UE 1000 may further include communications interface(s) 1014 that allow the UE 1000 to communicate with other computing devices 1016 (e.g., IMS nodes, other UEs) such as via a network. The communications interface(s) 1014 may facilitate transmitting and receiving wired and/or wireless signals over any suitable communications/data technology, standard, or protocol, as described herein. For example, the communications interface(s) 1014 can comprise one or more of a cellular radio, a wireless (e.g., IEEE 802.1x-based) interface, a Bluetooth® interface, and so on. In some embodiments, the communications interface(s) 1014 may include radio frequency (RF) circuitry that allows the UE 1000 to transition between different RATs, such as transitioning between communication with a 4G or 5G LTE RAT and a legacy RAT (e.g., 3G/2G). The communications interface(s) 1014 may further enable the UE 1000 to communicate over circuit-switch domains and/or packet-switch domains.

In various embodiments, the computer-readable memory 1004 comprises non-transitory computer-readable memory 1004 that generally includes both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The computer-readable memory 1004 may also be described as computer storage media and may include volatile and nonvolatile, removable and non-removable media implemented in any method or technology for storage of information, such as computer readable instructions, data structures, program modules, or other data. Computer-readable memory 1004, removable storage 1006 and non-removable storage 1008 are all examples of non-transitory computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the UE 1000. Any such computer-readable storage media may be part of the UE 1000.

The memory 1004 can include an eRTT client 1018 (i.e., computer-executable instructions (or logic)) that, when executed, by the processor(s) 1002, perform the various acts and/or processes disclosed herein. The UE 1000 may store content 1020 (which may include text content and non-text content) in the memory 1004 of the UE 1000 for access in performing the various acts and/or processes disclosed herein.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

We claim:

1. A first user equipment (UE) comprising:
a processor;
a display; and
memory storing computer-executable instructions that, when executed by the processor, cause the first UE to:
receive user input requesting to establish a communication session as a voice call that does not support an exchange of real time text (RTT) messages during the communication session;
receive, from a second UE over a telecommunications network, capability information indicating whether the second UE is capable of exchanging text content and/or non-text content via the RTT messages;
display, based at least in part on the capability information indicating that the second UE is capable of exchanging at least the text content via the RTT messages, a selectable option to upgrade the communication session to a RTT call that supports the exchange of the RTT messages during the communication session;

display, based at least in part on the capability information indicating that the second UE is capable of exchanging at least the text content via the RTT messages, a RTT conversation window on the display;

display, based at least in part on the capability information indicating that the second UE is capable of exchanging the non-text content via the RTT messages, a user interface element in a selectable state on the display next to the RTT conversation window;

receive user input indicating that the user interface element is selected;

insert a file into a RTT message; and send, over the telecommunications network, the file via the RTT message to the second UE.

2. The first UE of claim 1, wherein receiving the capability information comprises receiving, during setup of a communication session involving the first UE and the second UE, a Session Initiation Protocol (SIP) message with a header that contains a feature tag indicating that the second UE is capable of exchanging the non-text content via the RTT messages.

3. The first UE of claim 1, wherein:

receiving the capability information comprises receiving, during setup of a communication session involving the first UE and the second UE, a Session Initiation Protocol (SIP) message with a header that contains a first feature tag corresponding to a first type of non-text content that the second UE is capable of exchanging via the RTT messages;

the user interface element is displayed in the selectable state and comprises a first user interface element that corresponds to the first type of non-text content; and the computer-executable instructions, when executed by the processor, further cause the first UE to at least one of:

refrain from displaying a second user interface element that corresponds to a second type of non-text content based at least in part on the header not containing a second feature tag corresponding to the second type of non-text content; or display the second user interface element in the unselectable state on the display next to the RTT conversation window based at least in part on the header not containing the second feature tag corresponding to the second type of non-text content.

4. The first UE of claim 1, wherein the file is sent via the RTT message to the second UE with a same Quality of Service (QoS) as voice data during the communication session.

5. The first UE of claim 1, wherein the capability information comprises an Extensible Markup Language (XML) tag indicating that the second UE is capable of exchanging the non-text content via the RTT messages.

6. A method to be implemented by a first user equipment (UE), the method comprising:

receiving, by the first UE, user input requesting to establish a communication session as a voice call that does not support an exchange of real time text (RTT) messages during the communication session;

after receiving the user input, receiving, from a second UE over a telecommunications network, capability information indicating whether the second UE is capable of exchanging text content and/or non-text content via the RTT messages;

displaying, based at least in part on the capability information indicating that the second UE is capable of exchanging at least the text content via the RTT messages, a selectable option to upgrade the communication session to a RTT call that supports the exchange of the RTT messages during the communication session;

after displaying the selectable option, displaying, based at least in part on the capability information indicating that the second UE is capable of exchanging at least the text content via the RTT messages, a RTT conversation window on a display of the first UE;

displaying, based at least in part on the capability information indicating that the second UE is capable of exchanging the non-text content via the RTT messages, a user interface element in a selectable state on the display next to the RTT conversation window, wherein the user interface element, upon selection, allows a user of the first UE to include non-text content in a RTT message; and sending, by the first UE over the telecommunications network, the non-text content the RTT message to the second UE.

7. The method of claim 6, wherein the receiving of the capability information comprises receiving, during setup of a communication session involving the first UE and the second UE, a Session Initiation Protocol (SIP) message with a header that contains a feature tag indicating that the second UE is capable of exchanging the non-text content via the RTT messages.

8. The method of claim 6, wherein:

the receiving of the capability information comprises receiving, during setup of a communication session involving the first UE and the second UE, a Session Initiation Protocol (SIP) message with a header that contains a first feature tag corresponding to a first type of non-text content that the second UE is capable of exchanging via the RTT messages; and the user interface element is displayed in the selectable state and comprises a first user interface element that corresponds to the first type of non-text content, the method further comprising, based at least in part on the header not containing a second feature tag corresponding to a second type of non-text content:

refraining from displaying a second user interface element that corresponds to the second type of non-text content; or displaying the second user interface element in the unselectable state on the display next to the RTT conversation window.

9. The method of claim 6, wherein the capability information comprises an Extensible Markup Language (XML) tag indicating that the second UE is capable of exchanging the non-text content via the RTT messages.

10. The method of claim 6, wherein the capability information indicates that the second UE is capable of exchanging the non-text content via the RTT messages, the method further comprising:

receiving, by the first UE, user input indicating that the user interface element is selected; and inserting, by the first UE, a file into the RTT message, wherein the sending of the RTT message comprises sending the file via the RTT message.

11. The method of claim 10, wherein the sending of the file via the RTT message occurs after initiating setup of, and prior to establishing, a communication session involving the first UE and the second UE.

12. A method to be implemented by a first user equipment (UE), the method comprising:
    receiving, from a second UE over a telecommunications network, capability information indicating whether the second UE is capable of exchanging text content and/or non-text content via real time text (RTT) messages;
    displaying, based at least in part on the capability information indicating that the second UE is capable of exchanging at least the text content via the RTT messages, a RTT conversation window on a display of the first UE;
    based at least in part on the capability information indicating that the second UE is incapable of exchanging the non-text content via the RTT messages, at least one of:
        displaying a user interface element in a selectable state on the display next to the RTT conversation window, wherein the user interface element, upon selection, allows a user of the first UE to include the non-text content in a RTT message
        refraining from displaying the user interface element; or
        displaying the user interface element in an unselectable state on the display next to the RTT conversation window; and
    sending, over the telecommunications network, the RTT message to the second UE.

13. The method of claim 12, wherein:
    the first UE displays the user interface element in the selectable state on the display next to the RTT conversation window;
    the first UE executes an application for an established communication session involving the first UE and the second UE; and
    the sending of the RTT message occurs during the established communication session, the method further comprising:
        terminating the established communication session; and
        after the terminating of the established communication session, receiving, via a messaging application that is different from the application, non-text content from the second UE, the non-text content from the second UE having been sent during the established communication session and prior to the terminating of the established communication session.

14. The method of claim 12, further comprising:
    prior to the receiving of the capability information, receiving user input requesting to establish a communication session as a voice call that does not support an exchange of the RTT messages during the communication session; and
    based at least in part on the capability information indicating that the second UE is capable of exchanging at least the text content via the RTT messages, and prior to the displaying of the RTT conversation window, displaying, on the display, a selectable option to upgrade the communication session to a RTT call that supports the exchange of the RTT messages during the communication session.

15. The method of claim 12, wherein the receiving of the capability information comprises receiving, during setup of a communication session involving the first UE and the second UE, a Session Initiation Protocol (SIP) message with a header that contains a feature tag indicating that the second UE is capable of exchanging the text content via the RTT messages.

16. The method of claim 12, wherein the first UE displays the user interface element in the selectable state on the display next to the RTT conversation window, the method further comprising:
    receiving user input indicating that the user interface element is selected; and
    inserting a file into the RTT message, the file including the new non-text content or the particular non-text content selected by the user,
    wherein the sending of the RTT message comprises sending the file via the RTT message.

* * * * *